(12) United States Patent
Xing et al.

(10) Patent No.: US 9,609,561 B2
(45) Date of Patent: Mar. 28, 2017

(54) MOBILE COMMUNICATIONS METHOD, DEVICE, AND SYSTEM

(71) Applicant: HUAWEI TECHNOLOGIES CO., LTD., Shenzhen (CN)

(72) Inventors: Pingping Xing, Shanghai (CN); Ming Fang, Shanghai (CN); Yanyan Chen, Shenzhen (CN); Bin Tan, Lima (PE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/881,708

(22) Filed: Oct. 13, 2015

(65) Prior Publication Data
US 2016/0037417 A1 Feb. 4, 2016

Related U.S. Application Data

(63) Continuation of application No. PCT/CN2013/074160, filed on Apr. 12, 2013.

(51) Int. Cl.
*H04W 36/00* (2009.01)
*H04W 36/14* (2009.01)
(Continued)

(52) U.S. Cl.
CPC .......... *H04W 36/14* (2013.01); *H04W 80/00* (2013.01); *H04W 88/10* (2013.01); *H04W 88/02* (2013.01); *H04W 92/02* (2013.01)

(58) Field of Classification Search
CPC ..... H04W 92/00; H04W 80/00; H04W 88/12; H04W 88/08; H04W 80/02; H04W 92/02;
(Continued)

(56) References Cited

U.S. PATENT DOCUMENTS 6,708,031 B2 * 3/2004 Purnadi ............ H04W 36/0033
                                                    370/331
7,006,481 B2 * 2/2006 Terry ................... H04W 36/14
                                                    370/338
(Continued)

FOREIGN PATENT DOCUMENTS

CN          101431807          5/2009
CN          102595649          7/2012
(Continued)

OTHER PUBLICATIONS

International Search Report mailed Jan. 23, 2014 in corresponding international application PCT/CN2013/074160.
(Continued)

*Primary Examiner* — Mahendra Patel
(74) *Attorney, Agent, or Firm* — Staas & Halsey LLP

(57) ABSTRACT

The embodiments of present invention provide a mobile communications method, a device, and a system. The method is performed by an access network device, including: receiving, by using a terrestrial interface of a first network standard between an access network and a first core network, a first terrestrial interface message of the first network standard sent by the first core network; generating, according to an air interface protocol of an air interface of a second network standard between the access network and UE and the first terrestrial interface message, a first air interface message of the second network standard; and sending, by using the air interface of the second network standard, the first air interface message to the UE. The method implements direct communication between network devices of different standards in a mobile communications system, thereby decoupling an air interface from a terrestrial interface.

11 Claims, 10 Drawing Sheets

(51) Int. Cl.
*H04W 80/00* (2009.01)
*H04W 88/10* (2009.01)
*H04W 92/02* (2009.01)
*H04W 88/02* (2009.01)

(58) Field of Classification Search
CPC . H04W 76/022; H04W 88/16; H04W 76/062; H04W 36/08; H04W 36/38; H04W 36/14; H04J 3/22; H04L 12/66; H04Q 7/00
USPC ..... 455/411, 436; 370/216, 395.2, 230, 522, 370/414, 221.14
See application file for complete search history.

(56) References Cited

U.S. PATENT DOCUMENTS

| | | | | |
|---|---|---|---|---|
| 7,675,881 | B2 * | 3/2010 | Verma | H04W 92/02 370/328 |
| 2003/0185177 | A1 * | 10/2003 | Chitrapu | H04L 12/5692 370/335 |
| 2004/0162077 | A1 | 8/2004 | Kauranen et al. | |
| 2005/0083971 | A1 * | 4/2005 | Delaney | H04W 92/12 370/466 |
| 2005/0157673 | A1 * | 7/2005 | Verma | H04W 92/02 370/328 |
| 2007/0021120 | A1 | 1/2007 | Flore et al. | |
| 2008/0019320 | A1 * | 1/2008 | Phan | H04W 36/02 370/331 |
| 2010/0215015 | A1 * | 8/2010 | Miao | H04W 80/02 370/329 |
| 2010/0284372 | A1 * | 11/2010 | Marinescu | H04W 36/02 370/332 |
| 2011/0039562 | A1 * | 2/2011 | Balasubramanian | H04W 36/0033 455/436 |
| 2011/0110326 | A1 * | 5/2011 | Rexhepi | H04W 36/0022 370/331 |

FOREIGN PATENT DOCUMENTS

| | | |
|---|---|---|
| WO | WO2005032155 | 4/2005 |
| WO | 2009/146864 A1 | 12/2009 |
| WO | 2013/041128 A1 | 3/2013 |

OTHER PUBLICATIONS

Extended European Search Report dated Jun. 21, 2016 in corresponding European Patent Appiication No. 13881957.8.
International Search Report, dated Jan. 23, 2014, in corresponding International Application No. PCT/CN2013/074160 (19 pp.).

* cited by examiner (2a)

(2b)

(2c)

MOBILE COMMUNICATIONS METHOD, DEVICE, AND SYSTEM

CROSS-REFERENCE TO RELATED APPLICATIONS

This application is a continuation of International Application No. PCT/CN2013/074160, filed on Apr. 12, 2013, which is hereby incorporated by reference in its entirety.

TECHNICAL FIELD

Embodiments of the present invention relate to the field of communications technologies, and in particular to a mobile communications method, a device, and a system.

BACKGROUND

Currently, 2G/3G (2nd Generation/3rd Generation, 2nd generation mobile telecommunications technology/3rd generation mobile telecommunications technology) networks have been widely deployed in many regions. With rapid development of communications technologies, next-generation evolved networks, such as an LTE (Long Term Evolution) network, have covered some urban areas and telephone traffic hotspot regions. Therefore, an evolved network and a 2G/3G network coexist in these areas. In order to reduce costs, a Single RAN (Single Radio Access Network, single radio access network) solution for sharing a radio access network device is generated. A Fusion Network (fusion network) provides a technology evolution method for the Single RAN, where a cross-system interoperability technology is a key technology for implementing fusion of networks of the Fusion Network in the Single RAN solution.

During an existing cross-system interoperability process, an air interface and a terrestrial interface are in one-to-one correspondence, and an NAS (Non Access Stratum, non-access stratum) interface and the air interface/terrestrial interface are also in one-to-one correspondence, which is related to network standards of the NAS interface, the air interface and the terrestrial interface. For example, a UMTS (universal mobile telecommunications system) network UE (user equipment) is connected to a UMTS core network by using an air interface and a terrestrial interface of a UMTS network. If the UE connected to the UMTS network needs handover to an LTE network, the following operations need to be performed: a UMTS access network sends a handover request to a UMTS core network; the UMTS core network sends the request to a target LTE core network; the target LTE core network sends the handover request to a target LTE access network; the target LTE access network performs air interface resource configuration and returns a handover response to the LTE core network; the LTE core network then sends a handover command message to the UMTS network UE by using the terrestrial interface and the air interface of the UMTS network; and the UMTS network UE configures an air interface connection according to a received air interface resource configuration requirement, and then accesses the target LTE network. Such a inter-standard interoperation has a complex process, much signaling, and a long delay, which severely compromises user experience.

SUMMARY

In order to resolve problems in the prior art that a inter-standard operation has a complex process, much signaling, and a long delay, embodiments of the present invention provide a mobile communications method, a device, and a system. The technical solutions are as follows:

According to a first aspect, a mobile communications method is provided, where the method includes:

receiving, by an access network device by using a terrestrial interface of a first network standard between an access network and a first core network, a first terrestrial interface message of the first network standard sent by the first core network; generating, by the access network device according to an air interface protocol of an air interface of a second network standard between the access network and a user equipment UE and the first terrestrial interface message, a first air interface message of the second network standard; and sending, by the access network device by using the air interface of the second network standard, the first air interface message to the UE.

With reference to the first aspect, in a first possible implementation manner of the first aspect, before the receiving, by an access network device by using a terrestrial interface of a first network standard between an access network and a first core network, a first terrestrial interface message sent by the first core network, the method further includes: if the access network device determines the UE is handover to the second network standard, allocating a resource to the UE in a network of the second network standard, and instructing the UE to access the network of the second network standard.

With reference to the first aspect or the first possible implementation manner of the first aspect, in a second possible implementation manner of the first aspect, the method further includes:

if the access network device determines the UE is handover from the first core network to a second core network, switching the UE from the terrestrial interface of the first network standard between the access network and the first core network to a terrestrial interface of a third network standard between the access network and the second core network.

With reference to the second possible implementation manner of the first aspect, in a third possible implementation manner of the first aspect, the method further includes: receiving, by the access network device by using the terrestrial interface of the third network standard between the access network and the second core network, a second terrestrial interface message of the third network standard sent by the second core network; generating, by the access network device according to the air interface protocol of the air interface of the second network standard and the second terrestrial interface message, a second air interface message of the second network standard; and sending, by the access network device by using the air interface of the second network standard, the second air interface message to the UE.

According to a second aspect, an access network device is provided, where the access network device includes:

a first receiving module, configured to receive, by using a terrestrial interface of a first network standard between an access network and a first core network, a first terrestrial interface message of the first network standard sent by the first core network;

a first generating module, configured to generate, according to an air interface protocol of an air interface of a second network standard between the access network and a user equipment UE and the first terrestrial interface message received by the first receiving module, a first air interface message of the second network standard; and a first sending module, configured to send, by using the air interface of the second network standard, the first air interface message generated by the first generating module to the UE.

With reference to the second aspect, in a first possible implementation manner of the second aspect, the access network device further includes: a first switching module, configured to: before the first receiving module receives the first terrestrial interface message sent by the first core network, if the access network device determines the UE is handover to the second network standard, allocate a resource to the UE in a network of the second network standard, and instruct the UE to access the network of the second network standard.

With reference to the second aspect or the first possible implementation manner of the second aspect, in a second possible implementation manner of the second aspect, the access network device further includes: a second switching module, configured to: if the access network device determines the UE is handover from the first core network to a second core network, switch the UE from the terrestrial interface of the first network standard between the access network and the first core network to a terrestrial interface of a third network standard between the access network and the second core network.

With reference to the second possible implementation manner of the second aspect, in a third possible implementation manner of the second aspect, the first receiving module is further configured to receive, by using the terrestrial interface of the third network standard between the access network and the second core network, a second terrestrial interface message of the third network standard sent by the second core network; the first generating module is further configured to generate, according to the air interface protocol of the air interface of the second network standard and the second terrestrial interface message received by the first receiving module, a second air interface message of the second network standard; and the first sending module is further configured to send, by using the air interface of the second network standard, the second air interface message generated by the first generating module to the UE.

According to a third aspect, a mobile communications method is provided, where the method includes:

receiving, by an access network device by using an air interface of a second network standard between an access network and a user equipment UE, a third air interface message of the second network standard sent by the UE; generating, by the access network device according to an interface protocol of a terrestrial interface of a first network standard between the access network and a first core network and the third air interface message, a third terrestrial interface message of the first network standard; and sending, by the access network device by using the terrestrial interface of the first network standard between the access network and the first core network, the third terrestrial interface message to the first core network.

With reference to the third aspect, in a first possible implementation manner of the third aspect, before the receiving, by an access network device by using an air interface of a second network standard between an access network and a user equipment UE, a third air interface message of the second network standard sent by the UE, the method further includes: if the access network device determines the UE is handover to the second network standard, allocating a resource to the UE in a network of the second network standard, and instructing the UE to access the network of the second network standard.

With reference to the third aspect or the first possible implementation manner of the third aspect, in a second possible implementation manner of the third aspect, the method further includes: if the access network device determines the UE is handover from the first core network to a second core network, switching the UE from the terrestrial interface of the first network standard between the access network and the first core network to a terrestrial interface of a third network standard between the access network and the second core network.

With reference to the second possible implementation manner of the third aspect, in a third possible implementation manner of the third aspect, the method further includes: receiving, by the access network device by using the air interface of the second network standard, a fourth air interface message sent by the UE; generating, by the access network device according to an interface protocol of the terrestrial interface of the third network standard between the access network and the second core network and the fourth air interface message, a fourth terrestrial interface message of the third network standard; and sending, by the access network device by using the terrestrial interface of the third network standard between the access network and the second core network, the fourth terrestrial interface message to the second core network.

According to a fourth aspect, an access network device is provided, where the access network device includes:

a second receiving module, configured to receive, by using an air interface of a second network standard between an access network and a user equipment UE, a third air interface message of the second network standard sent by the UE; a second generating module, configured to generate, according to an interface protocol of a terrestrial interface of a first network standard between the access network and a first core network and the third air interface message received by the second receiving module, a third terrestrial interface message of the first network standard; and a second sending module, configured to send, by using the terrestrial interface of the first network standard between the access network and the first core network, the third terrestrial interface message generated by the second generating module to the first core network.

With reference to the fourth aspect, in a first possible implementation manner of the fourth aspect, the access network device further includes: a third switching module, configured to: before the second receiving module receives the third air interface message of the second network standard sent by the UE, if the access network device determines the UE is handover to the second network standard, allocate a resource to the UE in a network of the second network standard, and instruct the UE to access the network of the second network standard.

With reference to the fourth aspect or the first possible implementation manner of the fourth aspect, in a second possible implementation manner of the fourth aspect, the access network device further includes: a fourth switching module, configured to: if the access network device determines the UE is handover from the first core network to a second core network, switch the UE from the terrestrial interface of the first network standard between the access network and the first core network to a terrestrial interface of a third network standard between the access network and the second core network.

With reference to the second possible implementation manner of the fourth aspect, in a third possible implementation manner of the fourth aspect, the second receiving module is further configured to receive, by using the air interface of the second network standard, a fourth air interface message of the second network standard sent by the UE; the second generating module is further configured to generate, according to an interface protocol of the terrestrial interface of the third network standard between the access network and the second core network and the fourth air interface message received by the second receiving module, a fourth terrestrial interface message of the third network standard; and the second sending module is further configured to send, by using the terrestrial interface of the third network standard between the access network and the second core network, the fourth terrestrial interface message generated by the second generating module to the second core network.

According to a fifth aspect, a mobile communications method is provided, where the method includes: receiving, by a user equipment UE by using an air interface of a second network standard between an access network and the UE, a first air interface message of the second network standard sent by an access network device; and sending, by the UE, a response message to the access network device according to the first air interface message, where the first air interface message is generated according to an air interface protocol of the air interface of the second network standard and a first terrestrial interface message of a first network standard sent by a first core network.

With reference to the fifth aspect, in a first possible implementation manner of the fifth aspect, the first air interface message includes non-access stratum NAS information of the first core network, where a network standard of the NAS information is a third network standard; and the method further includes:

parsing out, by the UE, the NAS information from the first air interface message according to a network standard of the NAS information.

With reference to the first possible implementation manner of the fifth aspect, in a second possible implementation manner of the fifth aspect, the first air interface message further includes indication information, where the indication information is used to indicate the network standard of the NAS information; and the method further includes:

parsing the indication information in the first air interface message, to obtain the network standard of the NAS information.

With reference to the second possible implementation manner of the fifth aspect, in a third possible implementation manner of the fifth aspect, before the parsing out, by the UE, the NAS information from the first air interface message according to a network standard of the NAS information, the method further includes:

receiving, by the UE, a notification message that includes a network standard of a non-access stratum in the first core network and is sent by the access network device, where the network standard of the non-access stratum in the first core network is the third network standard; and determining the network standard of the NAS information according to the network standard of the non-access stratum in the first core network.

According to a sixth aspect, a user equipment is provided, where the user equipment includes:

a third receiving module, configured to receive, by using an air interface of a second network standard between an access network and the user equipment UE, a first air interface message of the second network standard sent by an access network device; and a third sending module, configured to send a response message to the access network device according to the first air interface message received by the third receiving module, where the first air interface message is generated according to an air interface protocol of the air interface of the second network standard and a first terrestrial interface message of a first network standard sent by a first core network.

With reference to the sixth aspect, in a first possible implementation manner of the sixth aspect, the first air interface message includes non-access stratum NAS information of the first core network, where a network standard of the NAS information is a third network standard; and the user equipment further includes:

a parsing module, configured to parse out, according to the network standard of the NAS information, the NAS information from the first air interface message received by the third receiving module.

With reference to the first possible implementation manner of the sixth aspect, in a second possible implementation manner of the sixth aspect, the first air interface message further includes indication information, where the indication information is used to indicate the network standard of the NAS information; and the parsing module is further configured to parse the indication information in the first air interface message received by the third receiving module, to obtain the network standard of the NAS information.

With reference to the first possible implementation manner of the sixth aspect, in a third possible implementation manner of the sixth aspect, before the parsing module parses out, according to the network standard of the NAS information, the NAS information from the first air interface message received by the third receiving module, the third receiving module is further configured to receive a notification message that includes a network standard of a non-access stratum in the first core network and is sent by the access network device, where the network standard of the non-access stratum in the first core network is the third network standard; and the parsing module is further configured to determine the network standard of the NAS information according to the network standard of the non-access stratum in the first core network.

According to a seventh aspect, a mobile communications method is provided, where the method includes:

generating, by a user equipment UE, a third air interface message of a second network standard; and sending, by the UE by using an air interface of the second network standard between an access network and the UE, the third air interface message to an access network device, so that the access network device generates, according to an interface protocol of a terrestrial interface of a first network standard between the access network and a first core network and the third air interface message, a third terrestrial interface message of the first network standard.

With reference to the seventh aspect, in a first possible implementation manner of the seventh aspect, before the generating, by UE, a third air interface message of a second network standard, the method includes:

generating, by the UE, NAS information according to a network standard of a non-access stratum in the first core network, where the network standard of the non-access stratum in the first core network is a third network standard; and encapsulating, by the UE, the NAS information into the third air interface message of the second network standard.

According to an eighth aspect, user equipment is provided, where the user equipment includes:

a fourth generating module, configured to generate a third air interface message of a second network standard; and a fourth sending module, configured to send, by using an air interface of the second network standard between an access network and the UE, the third air interface message to an access network device, so that the access network device generates, according to an interface protocol of a terrestrial interface of a first network standard between the access network and a first core network and the third air interface message, a third terrestrial interface message of the first network standard.

With reference to the eighth aspect, in a first possible implementation manner of the eighth aspect, the fourth generating module is further configured to:

before generating the third air interface message, generate NAS information according to a network standard of a non-access stratum in the first core network, where the network standard of the non-access stratum in the first core network is a third network standard; and encapsulate the NAS information into the third air interface message of the second network standard.

In the embodiments of the present invention, during downlink message transmission, an access network device receives, by using a terrestrial interface of a first network standard between an access network and a first core network, a first terrestrial interface message of the first network standard sent by the first core network, to implement communication between the access network and the first core network; and generates, according to an air interface protocol of an air interface of a second network standard between the access network and a user equipment UE and the first terrestrial interface message, a first air interface message of the second network standard, and sends the first air interface message to the UE, to implement communication between the access network and the user equipment by using the generated first air interface message, thereby implementing direct communication between devices of different network standards; or during uplink message transmission, an access network device receives, by using an air interface of a second network standard between an access network and a user equipment UE, a third air interface message of the second network standard sent by the UE, to implement communication between the user equipment and the access network; the access network device generates, according to an interface protocol of a terrestrial interface of a first network standard between the access network and a first core network and the third air interface message, a third terrestrial interface message of the first network standard, and sends the third terrestrial interface message to the first core network, to implement communication between the access network and the first core network by using the generated third terrestrial interface message, thereby implementing direct communication between devices of different network standards. According to the embodiments of the present invention, while direct communication between devices of different network standards in a mobile communications system is implemented, a cross-system mobile communication process is simplified, signaling and a delay of an inter-system operation are reduced, and an air interface is decoupled from a terrestrial interface, thereby improving user experience.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
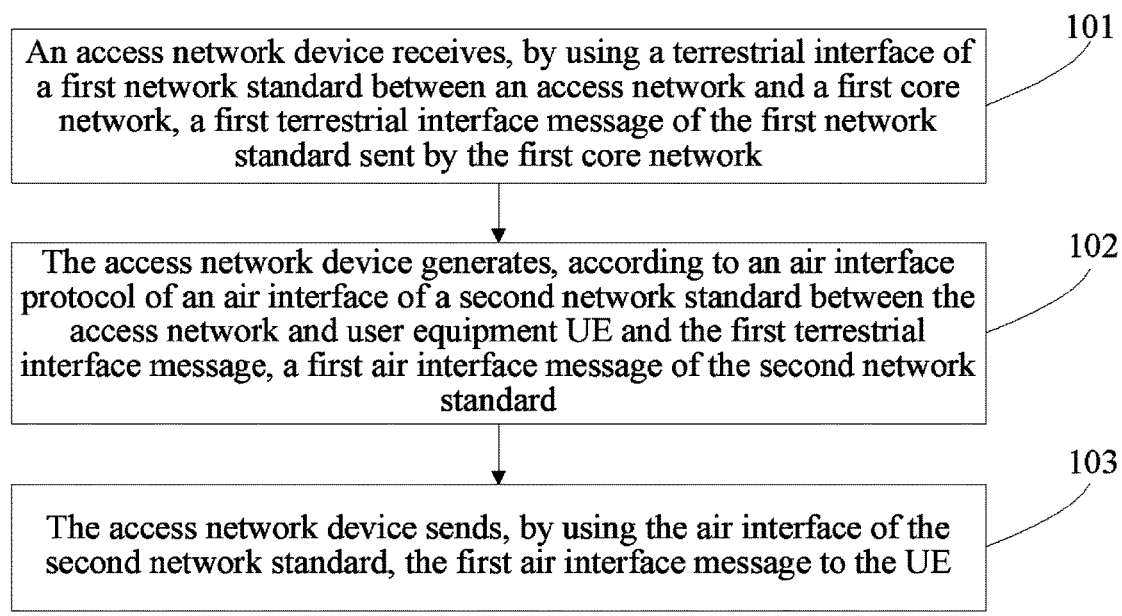
FIG. 1 is a flowchart of a mobile communications method according to an embodiment of the present invention.

An embodiment provides a mobile communications method. Referring to FIG. 1, the process of the method provided in this embodiment is specifically described as follows.

101: An access network device receives, by using a terrestrial interface of a first network standard between an access network and a first core network, a first terrestrial interface message of the first network standard sent by the first core network.

The first core network may include a radio access layer and a non-access stratum, where a network standard of the radio access layer in the first core network may be the first network standard, and a network standard of the non-access stratum may be any network standard, which is not limited herein. The terrestrial interface between the first core network and the access network is a terrestrial interface of the first network standard. Moreover, the non-access stratum in the first core network may be an independent network device, or may be integrated in any network device in a core network, such as an MME (mobility management entity), which is not limited herein.

102: The access network device generates, according to an air interface protocol of an air interface of a second network standard between the access network and a user equipment UE and the first terrestrial interface message, a first air interface message of the second network standard.

Manners used in step 102 specifically may be, but are not limited to, the following manners:

Manner 1: Determine, according to the first terrestrial interface message and a mapping relationship between terrestrial interface messages of the first network standard and air interface messages of the second network standard, to generate a first air interface message of the second network standard; and generate the first air interface message of the second network standard according to an air interface protocol of an air interface of the second network standard.

The mapping relationship between the terrestrial interface messages of the first network standard and the air interface messages of the second network standard may be preset according to functions of messages of the two standards, and may be in a table form or in another form. It should be noted that, a situation in which one terrestrial interface message is corresponding to multiple air interface messages may occur, which is not limited herein.

Manner 2: Determine, according to the first terrestrial interface message, to generate an air interface message of the first network standard; and generate, according to an air interface message correspondence between the first network standard and the second network standard, and an air interface protocol of the second network standard, a first air interface message of the second network standard.

The generating an air interface message of the first network standard according to the first terrestrial interface message belongs to the prior art, and is not described again.

Specifically, the generating, according to an air interface message of the first network standard and an air interface protocol of the second network standard, a first air interface message of the second network standard may be searching a relationship table between the air interface messages of the second network standard and the air interface messages of the first network standard according to the air interface message of the first network standard, to determine the first air interface message of the second network standard, and generating the first air interface message according to the air interface protocol of the second network standard, which is not limited herein.

Manner 3: Determine, according to the first terrestrial interface message, a terrestrial interface message, corresponding to the first terrestrial interface message, of the second network standard; and generate a first air interface message of the second network standard according to the terrestrial interface message of the second network standard and an air interface protocol of the second network standard.

Specifically, the determining, according to the first terrestrial interface message, a terrestrial interface message, corresponding to the first terrestrial interface message, of the second network standard may be presetting, in the access network device, a relationship mapping table between terrestrial interface messages of the first network standard and terrestrial interface messages of the second network standard, and determining the terrestrial interface message of the second network standard in a table lookup manner, which is not limited herein.

The generating a first air interface message of the second network standard according to the terrestrial interface message of the second network standard and an air interface protocol of the second network standard belongs to the prior art, and is not described again herein.

103: The access network device sends, by using the air interface of the second network standard, the first air interface message to the UE.

In steps 101 to 103, the access network device may provide related services of at least two network standards including the first network standard and the second network standard, and specifically, the access network device may be an SRC (single radio controller).

The first network standard and the second network standard may be the same or different, which is not limited herein. For example, the first network standard and the second network standard both may be any one of GSM (Global System for Mobile Communications), UMTS, and LTE, or may be another network standard.

To sum up, according to the mobile communications method provided in this embodiment, an access network device receives, by using a terrestrial interface of a first network standard between an access network and a first core network, a first terrestrial interface message of the first network standard sent by the first core network, to implement communication between the access network and the first core network; and generates, according to an air interface protocol of an air interface of a second network standard between the access network and a user equipment UE and the first terrestrial interface message, a first air interface message of the second network standard, and sends the first air interface message to the UE, to implement communication between the access network and the UE by using the generated first air interface message, thereby implementing direct communication between devices of different standards in a mobile communications system, simplifying a cross-system mobile communication process, reducing signaling and a delay of an inter-system operation, decoupling from an air interface to a terrestrial interface, and improving user experience.

Optionally, in an implementation scenario, before step 101, step 100 is performed as follows:

100: If the access network device determines to handover the UE to the second network standard, allocate a resource to the UE in a network of the second network standard, and instruct the UE to access the network of the second network standard.

Before the foregoing handover occurs, the UE may be located in a network of the first network standard, or may be located in a network of any other network standard, which is not limited herein.

For this step, how the access network device determines whether a network standard of an air interface between the access network and the user equipment needs to be switched is not specifically limited in this embodiment. For example, it may be determined, according to that signal strength of existing network standard coverage cannot satisfy requirements of user equipment, that a network standard of an air interface between an access network and the user equipment needs to be switched. For another example, it may be determined, according to that traffic provided by an existing network standard cannot satisfy requirements of user equipment, that a network standard of an air interface between an access network and the user equipment needs to be switched, or whether a network standard of an air interface between an access network and user equipment needs to be switched may be determined according to other service requirements.

Figure 2:
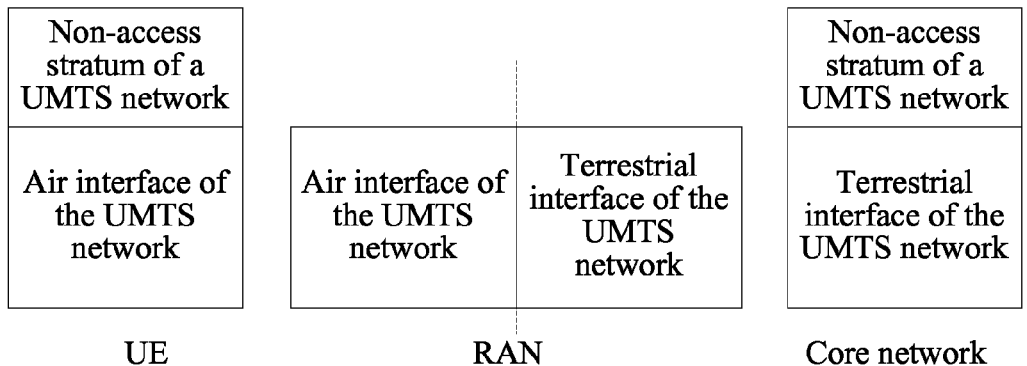
FIG. 2 is a schematic diagram of a mobile communication process according to an embodiment of the present invention.
Figure 2:
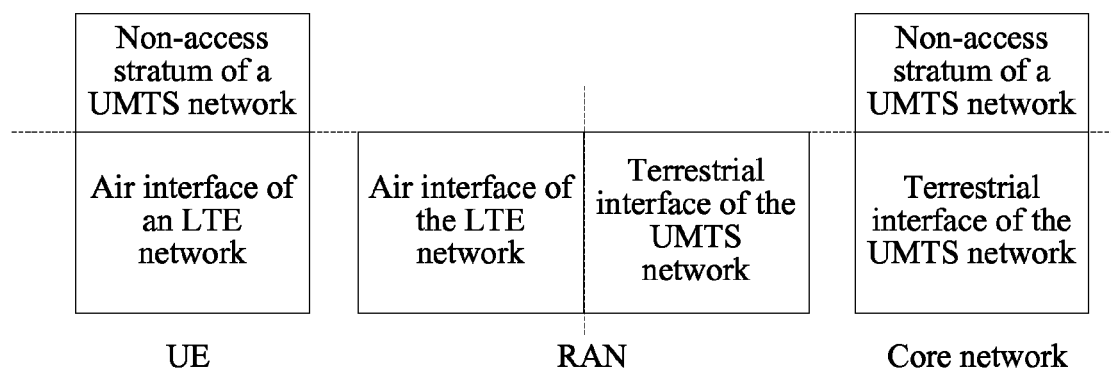
Figure 2:
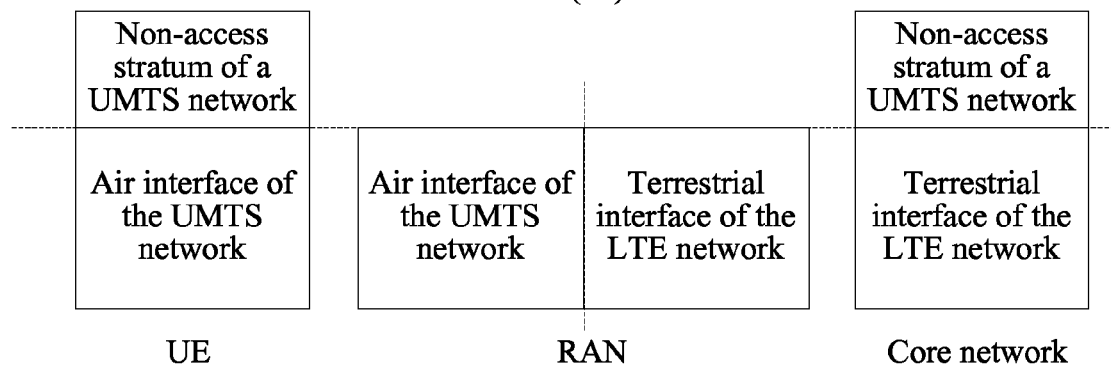

For ease of description, as shown in FIG. 2 (2a), the core network is a first core network, a network standard of a terrestrial interface between the core network and an RAN is a UMTS network, an access network is an RAN (Radio Access Network, radio access network), and a network standard of user equipment is a UMTS network. An air interface standard switching situation is described as follows by using examples:

It is assumed that according to that signal strength of a UMTS network cell in which a UE is located cannot satisfy call requirements of the UE, or that traffic provided by a UMTS network in which a UE is located cannot satisfy traffic requirements of the UE, an RAN needs to be switched to an LTE network cell, that is, a second network standard is LTE. Then, the RAN allocates a channel resource to the UE and performs related parameter configuration directly in a network of the second network standard, and sends a handover command to instruct the UE to access the LTE network cell. When the UE is successfully handover to the LTE network cell, a resource occupied by the UE in the UMTS network cell is released, and the air interface switching succeeds. An air interface between a UE and an RAN shown in FIG. 2 (2b) is an air interface of a second network standard.

It should be noted that, when a UE is switched between air interfaces of different standards, inter-standard core network switching may not be performed, and only air interface switching is performed, that is, before and after a network standard of an air interface between an access network and the user equipment is switched, a terrestrial interface between the access network and a first core network may remain unchanged.

In the foregoing implementation scenario, when the access network device determines the UE is handover to the second network standard, a resource is directly allocated to the UE in a network of the second network standard, and then the UE is instructed to access the network of the second network standard, thereby avoiding a complex signaling interaction process caused by inter-standard switching in the prior art, and a delay caused by this, and greatly improving user experience.

Optionally, in another implementation scenario, the method further includes:

104: If the access network device determines the UE is handover from the first core network to a second core network, switch the UE from the terrestrial interface of the first network standard between the access network and the first core network to a terrestrial interface of a third network standard between the access network and the second core network.

Moreover, the third network standard may be the same as the first network standard or the second network standard, or may be a network standard except the first network standard and the second network standard, which is not limited herein.

A core network switching method and a determining condition may be implemented by using the prior art, for example, when traffic provided by an existing network standard cannot satisfy requirements of a core network, whether a terrestrial interface between an access network and the core network needs to be switched is determined; moreover, whether switching of a terrestrial interface between the access network and the core network needs to be performed may be determined according to service requirements of a UE, which is not described again herein. As shown in FIG. 2 (2a), a terrestrial interface between a core network and an access network is a UMTS network terrestrial interface, and after switching, as shown in FIG. 2 (2c), a terrestrial interface between the core network and the access network is an LTE network terrestrial interface.

It should be noted that, after the core network switching in step 104 is performed, the terrestrial interface between the access network and the core network is switched, while the air interface between the access network and the user equipment may remain unchanged before and after the switching between core networks.

Further, the method may further include:

105: The access network device receives, by using a terrestrial interface of a third network standard between the access network and the second core network, a second terrestrial interface message of the third network standard sent by the second core network.

106: The access network device generates, according to the air interface protocol of the air interface of the second network standard and the second terrestrial interface message, a second air interface message of the second network standard.

For a specific implementation manner, reference may be made to step 102.

107: The access network device sends, by using the air interface of the second network standard, the second air interface message to the UE.

In the foregoing implementation scenario, when the access network device determines to perform core network switching, direct switching of a terrestrial interface between the access network and a core network is implemented, so that the UE can be rapidly switched to the target core network to receive information, without any air interface operation, thereby avoiding problems of excessive signaling and a large delay that are caused by switching between core networks of different standards.

Figure 3:
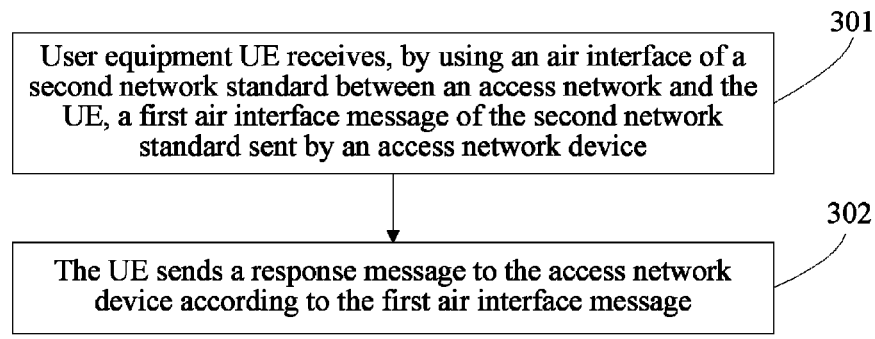
FIG. 3 is a flowchart of another mobile communications method according to an embodiment of the present invention.

An embodiment of the present invention provides another mobile communications method. Referring to FIG. 3, the method is executed by a user equipment, and is specifically described as follows.

301: The user equipment UE receives, by using an air interface of a second network standard between an access network and the UE, a first air interface message of the second network standard sent by an access network device.

302: The UE sends a response message to the access network device according to the first air interface message.

The first air interface message is generated according to an air interface protocol of the air interface of the second network standard and a first terrestrial interface message of a first network standard sent by a first core network; the response message may only serve as an acknowledgement for the first air interface message, which is not limited.

The second network standard and the first network standard may be the same, or may be different.

In the foregoing embodiment, a user equipment UE receives, by using an air interface of a second network standard between an access network and the UE, a first air interface message of the second network standard sent by an access network device, where the first air interface message is generated according to an air interface protocol of the air interface of the second network standard and a first terrestrial interface message of a first network standard sent by a first core network, so that communication among the UE, the access network, and the first core network is implemented, thereby implementing direct communication between devices of different network standards, simplifying a cross-system mobile communication process, reducing signaling and a delay of an inter-system operation, decoupling an air interface from a terrestrial interface, and improving user experience.

Optionally, in an implementation scenario, the first air interface message may include non-access stratum NAS information of the first core network, where a network standard of the NAS information is a third network standard; and the method further includes:

303: Parse out, according to a network standard of NAS information, the NAS information from the first air interface message.

The third network standard may be GSM, UMTS, or LTE, or may be another network standard, and the third network standard may be the same as the first network standard or the second network standard, or may be another standard except the first network standard and the second network standard, which is not limited herein.

Specifically, the core network shown in FIG. 2 (2b) is a first core network, where a network standard of a non-access stratum in the first core network is UMTS. It is assumed that the first core network sends NAS information to an RAN through an NAS stratum of the first core network, the NAS information may be encapsulated in a first air interface message, a UE receives the first air interface message including the NAS information, and the UE parses out, according to the network standard of the non-access stratum in the first core network, the NAS information from the first air interface message.

Further, the first air interface message further includes indication information, where the indication information is used to indicate a network standard of the NAS information; and before step 303, the method further includes:

parsing the indication information in the first air interface message, to obtain the network standard of the NAS information.

Further, before step 303, the method further includes:

receiving, by the UE, a notification message that includes a network standard of a non-access stratum in the first core network and is sent by the access network device; and determining the network standard of the NAS information according to the network standard of the non-access stratum in the first core network.

The notification message may be a system message or another message, which is not limited herein. The network standard of the non-access stratum in the access network is the network standard of the NAS information. It should be noted that, the non-access stratum in the first core network may be an independent network device, or may be integrated in a device in the core network, such as an MME, which is not limited herein.

In the foregoing implementation scenario, in a situation in which a network standard of a non-access stratum of user equipment is inconsistent with a network standard of a non-access stratum in a core network, NAS information transmission is implemented, NAS interfaces are decoupled, a cross-system mobile communication process is simplified, signaling and a delay of an inter-system operation are reduced, and user experience is improved.

Figure 4:
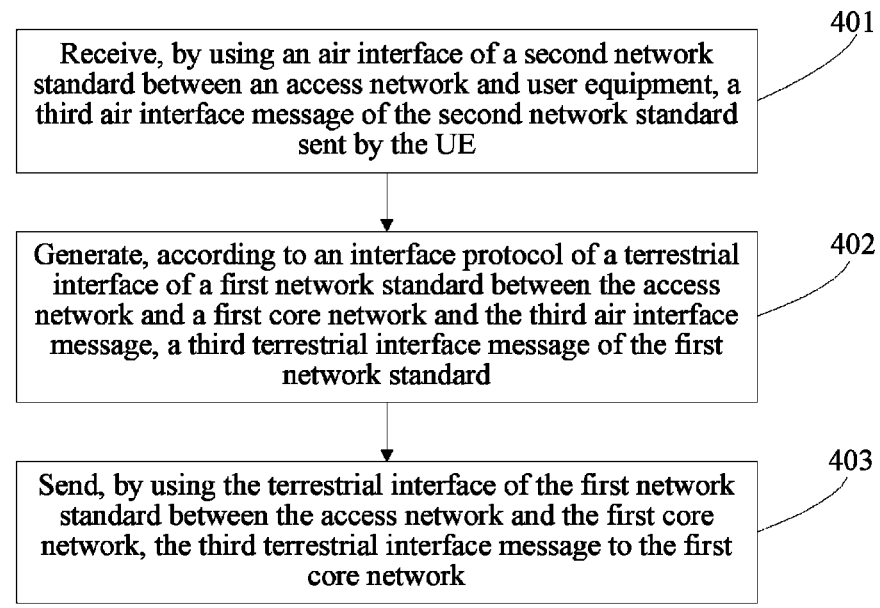
FIG. 4 is a flowchart of another mobile communications method according to an embodiment of the present invention.

An embodiment of the present invention provides another mobile communications method. Referring to FIG. 4, the method is executed by an access network device, and is specifically described as follows.

401: Receive, by using an air interface of a second network standard between an access network and user equipment, a third air interface message of the second network standard sent by the UE.

402: Generate, according to an interface protocol of a terrestrial interface of a first network standard between the access network and a first core network and the third air interface message, a third terrestrial interface message of the first network standard.

Manners used in step 402 specifically may be, but are not limited to, the following manners:

Manner 1: Determine, according to a mapping relationship between terrestrial interface messages of the first network standard and air interface messages of the second network standard, and the third air interface message, to generate a third terrestrial interface message of the first network standard; and generate the third terrestrial interface message of the first network standard according to an air interface protocol of the air interface of the second network standard.

The mapping relationship between the terrestrial interface messages of the first network standard and the air interface messages of the second network standard may be preset according to functions of messages of the two standards, and may be in a table form or in another form. It should be noted that, a situation in which one terrestrial interface message is corresponding to multiple air interface messages may occur, which is not limited herein.

Manner 2: Determine, according to the third air interface message, a terrestrial interface message, corresponding to the third air interface message, of the second network standard; and generate, according to the terrestrial interface message of the second network standard and the interface protocol of the terrestrial interface of the first network standard, a third terrestrial interface message of the first network standard.

The generating a terrestrial interface message of a second network standard according to the third air interface message belongs to the prior art, and is not described again.

Specifically, the generating, according to the terrestrial interface message of the second network standard and the interface protocol of the terrestrial interface of the first network standard, a third terrestrial interface message of the first network standard may be searching a relationship table between an interface protocol of a terrestrial interface of the second network standard and the interface protocol of the terrestrial interface of the first network standard according to the terrestrial interface message of the second network standard, and determining and generating the third terrestrial interface message of the first network standard, which is not limited herein.

Manner 3: Determine, according to the third air interface message, an air interface message, corresponding to the third air interface message, of the first network standard; and generate, according to the air interface message of the first network standard and the interface protocol of the terrestrial interface of the first network standard, a third terrestrial interface message of the first network standard.

Specifically, the determining, according to the third air interface message, an air interface message, corresponding to the third air interface message, of the first network standard may be presetting, in an access network device, a relationship mapping table between air interface messages of the first network standard and air interface messages of the second network standard may be preset, and determining the air interface message of the first network standard in a table lookup manner, which is not limited herein.

The generating a third terrestrial interface message of the first network standard according to the air interface message of the first network standard and an interface protocol of a terrestrial interface of the first network standard belongs to the prior art, and is not described again herein.

403: Send, by using the terrestrial interface of the first network standard between the access network and the first core network, the third terrestrial interface message to the first core network.

For related description of the access network device, reference may be made to the embodiment shown in FIG. 1. The first network standard and the second network standard may be the same or different, which is not limited herein. For example, the first network standard and the second network standard both may be any one of GSM, UMTS, and LTE, or may be another network standard.

For example, as shown in FIG. 2 (2b), the air interface of the second network standard between the access network and the user equipment is an LTE network air interface, and the terrestrial interface of the first network standard between the first core network and the access network is a UMTS network terrestrial interface. The UE sends a third air interface message to an RAN by using the LTE network air interface, and in step 402, the access network device generates a third terrestrial interface message of UMTS according to an interface protocol of the UMTS network terrestrial interface between the RAN and the core network and the third message, and sends the third terrestrial interface message to a UMTS core network in step 403.

To sum up, according to the method provided in this embodiment, a third air interface message sent by a UE is received by using an air interface of a second network standard between an access network and the user equipment, a third terrestrial interface message of a first network standard is generated according to an interface protocol of a terrestrial interface of the first network standard between the access network and a first core network and the third air interface message, and the third terrestrial interface message is sent to the first core network by using the terrestrial interface of the first network standard between the access network and the first core network, thereby implementing direct communication between network devices of different standards in a mobile communications system, simplifying a cross-system mobile communication process, reducing signaling and a delay of an inter-system operation, decoupling an air interface from a terrestrial interface, and improving user experience.

In an implementation scenario, before step 401, step 400 is performed as follows:

400: If the access network device determines the UE is handover to the second network standard, allocate a resource to the UE in a network of the second network standard, and instruct the UE to access the network of the second network standard.

For details, reference may be made to related description in step 100.

In another implementation scenario, the method further includes:

404: If the access network device determines the UE is handover from the first core network to a second core network, switch the UE from the terrestrial interface of the first network standard between the access network and the first core network to a terrestrial interface of a third network standard between the access network and the second core network.

The third network standard may be the same as the second network standard, or may be a network standard except the first network standard and the second network standard, which is not limited herein.

For example, before the switching in step 404 is performed, the core network shown in FIG. 2 (2a) is a first core network, a terrestrial interface between the first core network and an RAN is a UMTS network terrestrial interface, and after the switching to a second core network in step 404 is performed, the core network shown in FIG. 2 (2c) is the second core network, and the terrestrial interface of the third network standard between the second core network and the access network is an LTE network terrestrial interface.

Further, the foregoing method further includes:

405: The access network device receives, by using the air interface of the second network standard, a fourth air interface message of the second network standard sent by the UE.

406: The access network device generates, according to an interface protocol of the terrestrial interface of the third network standard between the access network and the second core network and the fourth air interface message, a fourth terrestrial interface message of the third network standard.

407: The access network device sends, by using the terrestrial interface of the third network standard between the access network and the second core network, the fourth terrestrial interface message to the second core network.

The third network standard may be the same as the second network standard, or may be a network standard except the first network standard and the second network standard, which is not limited herein.

An embodiment of the present invention provides a mobile communications method, and referring to FIG. 5, the method is executed by a UE, and is specifically described as follows.

501: The user equipment UE generates a third air interface message of a second network standard.

502: The UE sends, by using an air interface of the second network standard between an access network and the UE, the third air interface message to an access network device, so that the access network device generates, according to an interface protocol of a terrestrial interface of a first network standard between the access network and a first core network and the third air interface message, a third terrestrial interface message of the first network standard.

To sum up, according to the method provided in this embodiment, a user equipment UE generates a third air interface message of a second network standard, and the UE sends the third air interface message to an access network device by using an air interface of the second network standard between an access network and the UE, so that the access network device generates a third terrestrial interface message of a first network standard according to an interface protocol of a terrestrial interface of the first network standard between the access network and a first core network and the third air interface message, thereby implementing direct communication between devices of different network standards, completing cross-system decoupling between a terrestrial interface and an air interface, simplifying a cross-system mobile communication process, reducing signaling and a delay of an inter-system operation, and improving user experience.

Optionally, in an implementation scenario, before step 501, the method further includes:

500*a*: The UE generates NAS information according to a network standard of a non-access stratum in the first core network, where the network standard of the non-access stratum in the first core network is a third network standard.

The network standard of the NAS in the first core network may be preconfigured in the UE, or may be configured by the access network device by sending a message, where the message may be a system message or another message, which is not limited herein.

It should be noted that, the NAS in the first core network may independently serve as an individual network device, or may be integrated in a device in the first core network, such as an MME, which is not limited herein.

500*b*: The UE encapsulates the NAS information into the third air interface message of the second network standard.

For this step, the network standard of the air interface between the access network and the user equipment is recorded in the user equipment, and therefore, the user equipment encapsulates the NAS information into the third air interface message according to the recorded network standard of the air interface between the access network and the user equipment, for example, the UE encapsulates the NAS information into the third air interface message of the second network standard according to an air interface protocol of an air interface of the second network standard between the access network and the user equipment.

It should be noted that, the third air interface message may only include NAS information, or may further include other information sent to the access network device, which is not limited herein.

For example, it is assumed that the core network shown in FIG. 2 (2*b*) is a first core network, a network standard of a non-access stratum in the core network is UMTS, an air interface between the UE and an RAN is an LTE network air interface, and a terrestrial interface between the access network and the core network is a UMTS network terrestrial interface, that is, the first network standard is UMTS, and the second network standard is LTE. In step 500*a*, the UE generates NAS information according to a network standard (UMTS) of the NAS in the core network, and encapsulates the NAS information into a third air interface message of LTE in step 500*b*, and then sends the third air interface message to the RAN, and the RAN then generates a third terrestrial interface message according to an interface protocol of a UMTS network terrestrial interface and sends the third terrestrial interface message to a UMTS core network.

In the foregoing implementation scenario, by performing on the NAS information by the UE, direct communication in a situation in which an NAS stratum of a core network and a radio access layer in the UE in a mobile communications system have different standards is implemented, decoupling between NAS interfaces is implemented, a cross-system mobile communication process is simplified, signaling and a delay of an inter-system operation are reduced, and user experience is improved.

Figure 6:
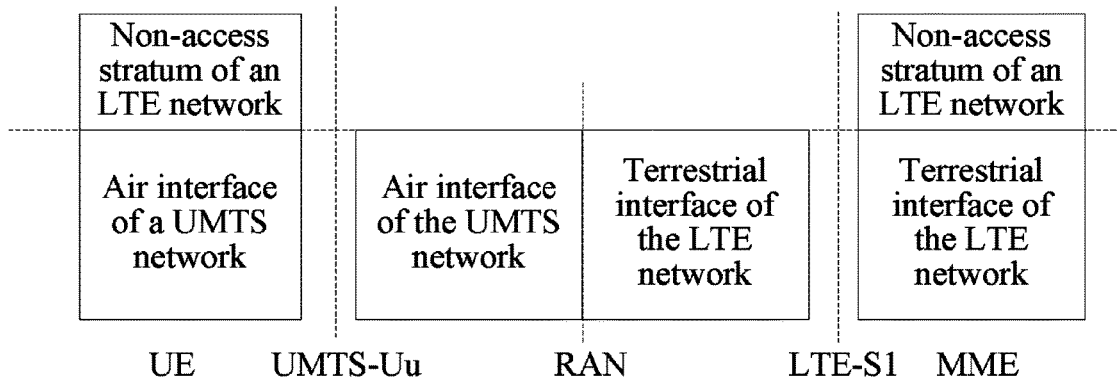
FIG. 6 is a schematic diagram of another mobile communication process according to an embodiment of the present invention.
Figure 7:
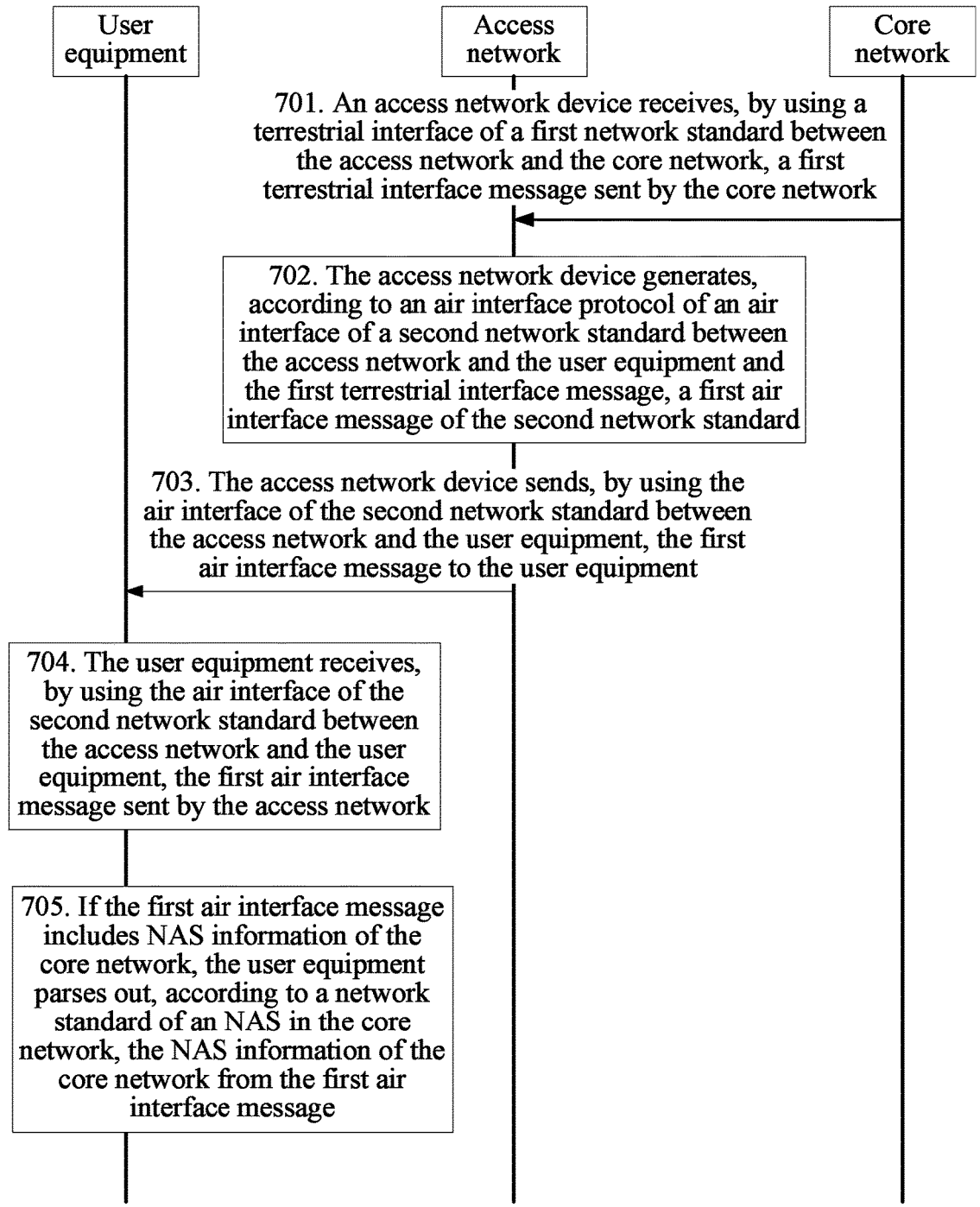
FIG. 7 is a signaling flowchart of mobile communication signaling according to an embodiment of the present invention.

An embodiment of the present invention provides another mobile communications method. For ease of description, in this embodiment, the method provided in this embodiment is described in detail by using an example in which a core network device shown in FIG. 6 is an MME in a core network, a network standard of which is an LTE network, a network standard of an NAS in the core network is an LTE network, an access network device is an access network logic entity having a capability of processing multiple network standards, and specifically, it may be that a terrestrial interface among an SRC, the MME, and an RAN is an S1 interface of an LTE network standard and an air interface between the RAN and user equipment is a Uu interface of a UMTS network standard. The SRC is an access network device having a capability of processing multiple network standards, so that after receiving, from a terrestrial interface between the access network and the core network, a first terrestrial interface message sent by the core network, the SRC may convert the received first terrestrial interface message into a first air interface message conforming to an air interface protocol of another network standard, thereby implementing network standard decoupling between an air interface and a terrestrial interface, and forming a real communications system fusing multiple network standards. Referring to FIG. 7, the process of the method provided in this embodiment is specifically described as follows:

701: An access network device receives, by using a terrestrial interface of a first network standard between an access network and a core network, a first terrestrial interface message sent by the core network.

For this step, the receiving manner of receiving the first terrestrial interface message sent by the core network is not specifically limited in this embodiment, and if the first terrestrial interface message is divided into multiple messages for sending, the foregoing access network device may specifically receive the first terrestrial interface message in a manner of receiving messages in batches, or in a manner of receiving messages once for all, which is not limited herein.

Specifically, by using an example in which the first terrestrial interface message is an E-RAB (enhanced radio access bearer) setup request, as shown in FIG. 6, an SRC receives, by using a terrestrial interface between an RAN and an MME, an E-RAB setup request (E-RAB SETUP REQUEST) sent by the MME. Certainly, for a situation in which there are multiple first terrestrial interface messages, the SRC may receive in batches, by using the terrestrial interface between the RAN and the MME, the first terrestrial interface messages sent by the MME.

It should be noted that, when processing a received message, each core network device, each access network device, or each user equipment in this embodiment and subsequent embodiments may further send a response message to a sending device of the message, and a process of sending and processing a response message of a message is not described in this embodiment. For example, after the SRC receives, by using the terrestrial interface between the RAN and the MME, the E-RAB SETUP REQUEST sent by the MME, the SRC sends a setup request response message (E-RAB SETUP RESPONSE) to the MME, and this setup request response message is not specifically described in this embodiment.

Additionally, each first terrestrial interface message mentioned in this embodiment and subsequent embodiments refers to a message on which an air interface process needs to be performed, or a message including information on which an air interface process needs to be performed; and a message on which no air interface process needs to be performed, and only limited to being processed between an access network and a core network, or a message not including information on which an air interface process needs to be performed is not described in this embodiment.

702: The access network device generates, according to an air interface protocol of an air interface of a second network standard between the access network and user equipment and the first terrestrial interface message, a first air interface message of the second network standard.

Specifically, for an implementation manner of step 702, reference may be made to related description in step 102.

Before this step, the access network device determines whether cross-system switching needs to be performed on the user equipment, and if the user equipment needs to be switched, the access network device determines a target standard network after the switching, and instructs the UE to access the target standard network, and moreover, the air interface protocol between the access network and the user equipment is switched to an air interface protocol of a target network standard. Therefore, if the user equipment is switched to the target standard network, in this step, the access network device generates a first air interface message according to an air interface protocol of a target standard air interface between the access network and the user equipment after the switching and a first terrestrial interface message; otherwise, in this step, the access network device generates a first air interface message according to an air interface protocol of an original air interface between the access network and the user equipment and a first terrestrial interface message.

Additionally, the network standard of the air interface between the access network and the user equipment is recorded in the access network, and therefore, the access network device generates a first air interface message according to the recorded air interface protocol between the access network and the user equipment and a first terrestrial interface message, for example, the access network device generates, according to the air interface protocol between the access network and the user equipment and a radio bearer parameter in the first terrestrial interface message, a radio bearer parameter corresponding to the air interface protocol, to obtain the first air interface message, for example, generates a radio bearer parameter of a corresponding air interface for radio bearer parameters such as a delay and a rate, to obtain the first air interface message, and certainly may also generate another parameter, which is not specifically limited herein.

For example, in FIG. 6, an SRC records that a network standard of an air interface between an RAN and a UE is a UMTS network, and in the manner 1 in step 102, the SRC queries, according to a received E-RAB setup request message, a preset mapping relationship table between an LTE terrestrial interface message and a UMTS air interface message, and determines to send a UMTS radio bearer setup message (RADIO BEARER SETUP) to the UE; the SRC generates, according to an air interface protocol of the UMTS network, a radio bearer parameter of a UMTS air interface, and encapsulates the radio bearer parameter into the radio bearer setup message to form a first air interface message.

In the manner 2 in step 102, the SRC generates, according to a received E-RAB setup request message, an LTE air interface message RRC (radio resource control) connection reconfiguration message (RRC Connection Reconfiguration), and determines, according to an air interface message mapping relationship table between LTE and UMTS, to send a UMTS radio bearer setup message to the UE; the SRC generates, according to an air interface protocol of a UMTS network, a radio bearer parameter of a UMTS air interface, and encapsulates the radio bearer parameter into the radio bearer setup message to form a first air interface message.

The first network standard and the second network standard separately may be any network standard, for example, may be a GSM network, or a UMTS network, or an LTE network, or another network standard, and the two may be the same, or may be different.

It should be noted that, if the network standard of the user equipment and the network standard of the core network are the same, that is, the first network standard and the second network standard are the same, the access network device may directly generate a first air interface message according to a recorded air interface protocol of an air interface between the access network and the user equipment and a first terrestrial interface message; if the network standard of the user equipment and the network standard of the core network are different, that is, the first network standard and the second network standard are different, the access network device may map an interface protocol of a terrestrial interface between the access network and the core network to air interface protocols between the access networks of multiple network standards and the user equipments of multiple network standards. For example, mapping between one terrestrial interface protocol and three air interface protocols is implemented, or mapping between two terrestrial interface protocols and three air interface protocols is implemented, or mapping between three terrestrial interface protocols and three air interface protocols is implemented, and the access network device maps an interface protocol of a terrestrial interface between the access network and the core network to an air interface protocol of an air interface between the access network and the user equipment by using a multi-protocol mapping capability of the access network device, and generates a first air interface message according to the air interface protocol of the air interface between the access network and the user equipment and a first terrestrial interface message.

It should be noted that, with the development of communications technologies, if a new network standard different from existing network standards is generated, or a new network standard compatible with existing various network standards is generated, a network standard of a terrestrial interface between the access network and the core network may be fixed as the new network standard. A multi-protocol mapping capability of the access network device in mapping the terrestrial interface protocol between the access network and the core network to air interface protocols between access networks of multiple network standards and user equipments of multiple network standards is converted into a one-to-many protocol mapping capability of mapping between one terrestrial interface protocol and multiple air interface protocols, and the access network device ensures, by using this one-to-many protocol mapping capability, that evolution of air interface network standards does not affect evolution of terrestrial interfaces, so as to really implement decoupling between a terrestrial interface and an air interface.

703: The access network device sends, by using the air interface of the second network standard between the access network and the user equipment, the first air interface message to the user equipment.

For this step, the manner of sending the first air interface message is not specifically limited in this embodiment, and if the first air interface message is divided into multiple messages for sending, the foregoing access network device may specifically send the first air interface message in a manner of sending messages in batches, or in a manner of sending messages once for all, which is not limited herein.

Specifically, still by using FIG. 6 as an example, first air interface messages are sent to the UE once for all by using the air interface between the RAN and the UE, and certainly, for a situation in which there are multiple first air interface messages, the first air interface messages may also be sent to the UE in batches by using the air interface between the RAN and the UE.

704: The user equipment receives, by using the air interface of the second network standard between the access network and the user equipment, the first air interface message sent by the access network device.

For this step, generally, the received first air interface message includes wireless network information; after performing step 704, the user equipment processes the wireless network information in the received first air interface message, and the processing manner is not limited in this embodiment, and includes, but is not limited to, configuring a radio resource for the wireless network information in the first air interface message, for example, configuring a radio resource such as a cell identifier, cell signal quality, or a location area; certainly, besides the foregoing information, content of the radio resource may further include other information, which is not specifically limited herein either; after completing processing of the wireless network information in the first air interface message, the user equipment performs step 705. However, in a special situation, the received first air interface message does not include wireless network information, and in this case, after performing step 704, the user equipment directly performs step 705.

Additionally, the receiving manner of receiving the first air interface message sent by the access network is not specifically limited in this embodiment, and if the first air interface message is divided into multiple messages for sending, the foregoing user equipment may specifically receive the first air interface message in a manner of receiving messages in batches, or in a manner of receiving messages once for all, which is not limited herein.

Specifically, by using FIG. 6 as an example, the user equipment receives once for all, by using the air interface between the RAN and the UE, the RADIO BEARER SETUP message sent by the SRC, and certainly, for a situation in which there are multiple first air interface messages, the UE may also receive in batches, by using the air interface between the RAN and the UE, the first air interface messages sent by the SRC.

705: If the first air interface message includes NAS information of the core network, the user equipment parses the first air interface message according to a network standard of an NAS in the core network, to obtain the NAS information of the core network.

The network standard of the NAS in the core network may be any network standard, may be the same as the first network standard or the second network standard, or may be different from either of the first network standard and the second network standard.

For this step, the manner of determining whether the first air interface message includes the NAS information of the core network is not specifically limited in this embodiment, for example, whether the first air interface message includes the NAS information of the core network may be determined by parsing the first air interface message, or whether the first air interface message includes the NAS information of the core network may also be determined by determining the length of the first air interface message.

Additionally, the manner of parsing the first air interface message is not specifically limited in this embodiment, and includes, but is not limited to, decapsulating the first air interface message, and parsing the first air interface message by means of decoding. Likewise, the manner of determining the network standard of the NAS in the core network is not specifically limited in this embodiment either, and includes, but is not limited to, that the access network sends the network standard of the NAS in the core network to the user equipment by using a system message or dedicated message.

The network standard of the NAS in the core network sent by the access network by using a system message or dedicated message is classified into uplink and downlink, that is, the access network may send an uplink network standard and a downlink network standard of the NAS in the core network for the uplink and the downlink respectively, and send the uplink network standard and the downlink network standard to the user equipment by using the system message or dedicated message. Additionally, if the network standard of the NAS in the core network is changed, the access network sends the changed network standard of the NAS in the core network to the user equipment.

It should be noted that, in a normal situation, the network standard of the NAS in the user equipment and the network standard of the NAS in the core network are kept consistent; after the network standard of the NAS in the core network is changed, the access network sends the changed network standard of the NAS in the core network to the user equipment by using a system message or dedicated message; after the user equipment receives the changed network standard of the NAS in the core network, the network standard of the NAS in the user equipment also becomes the changed network standard of the NAS, to keep the network standard of the NAS in the user equipment and the network standard of the NAS in the core network consistent, so as to help obtain, through parsing, the NAS information sent by the core network and obtain, by an access layer of the core network through parsing, the NAS information sent by the UE. However, specially, a situation in which in the network standard of the NAS in the user equipment and the network standard of the NAS in the core network are inconsistent occurs, and in this case, during message transfer, along with each message sending, the access network also sends a message including a network standard of NAS information simultaneously, to inform a device, which receives the message, of a network standard that should be used for obtaining, through parsing, the NAS information included in the message.

Additionally, in this embodiment and subsequent embodiments, the network standard of the NAS in the core network and the network standard of the NAS in the user equipment are the same, and the network standard of the NAS in the user equipment is changed as the network standard of the NAS in the core network is changed, and therefore, in this embodiment and subsequent embodiments, and whether the network standard of the NAS message included in the message belongs to the network standard of the NAS in the core network or belongs to the network standard of the NAS in the user equipment is not differentiated, which are both described as the network standard of the NAS in the core network.

Specifically, as shown in FIG. 6, the UE may determine, according to a notification message sent by the SRC and including the network standard of the NAS in the core network, that the network standard of the NAS in the core network is LTE.

Figure 5:
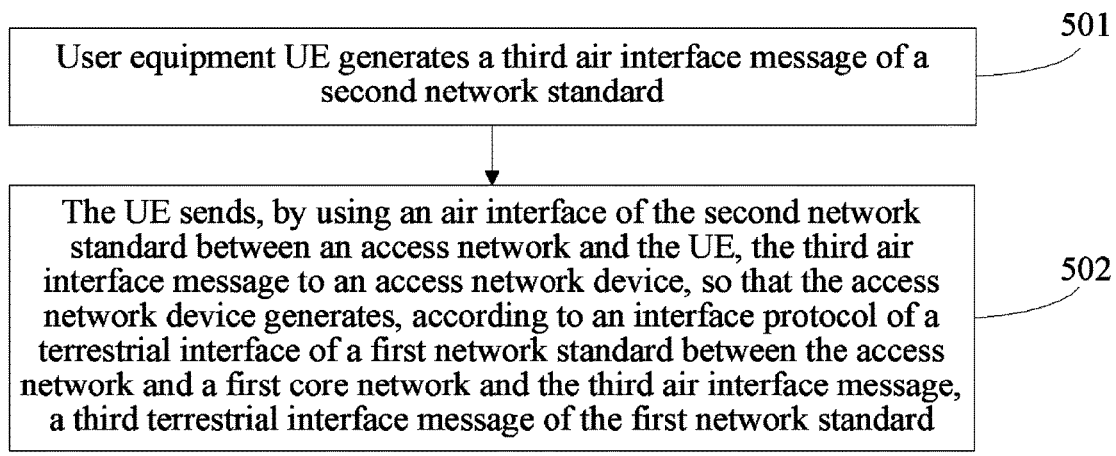
FIG. 5 is a flowchart of still another mobile communications method according to an embodiment of the present invention.

Additionally, in the schematic diagram of mobile communication provided in FIG. 6 in this embodiment, the user equipment may be an individual user equipment, or may be multiple user equipments; the network standard corresponding to the core network in the schematic diagram of mobile communication provided in FIG. 6 is not specifically limited in this embodiment, for example, may be an LTE network, or may be a GSM network, or a UMTS network, or another network standard; the network standard of the core network in the schematic diagram of mobile communication provided in FIG. 5 is not specifically limited in this embodiment either, for example, may be an LTE network, or may be a GSM network, or a UMTS network, or another network standard; the network standard of the NAS in the core network in the schematic diagram of mobile communication provided in FIG. 5 is likewise not specifically limited in this embodiment, for example, may be an LTE network, or may be a GSM network, or a UMTS network, or another network standard.

To sum up, according to the method provided in this embodiment, after generating a first air interface message by using a first terrestrial interface message that is sent by a core network and received according to an air interface protocol between an access network and user equipment and by using a terrestrial interface, an access network device sends the first air interface message to the user equipment, so that the user equipment performs corresponding processing on the first air interface message, so that cross-system fusion is implemented while decoupling between a terrestrial interface and an air interface in mobile communication is completed, thereby implementing network standard decoupling between an NAS interface and an air interface and between the NAS interface and a terrestrial interface, simplifying a cross-system mobile communication process, reducing signaling and a delay of an inter-system operation, and improving user experience.

Figure 8:
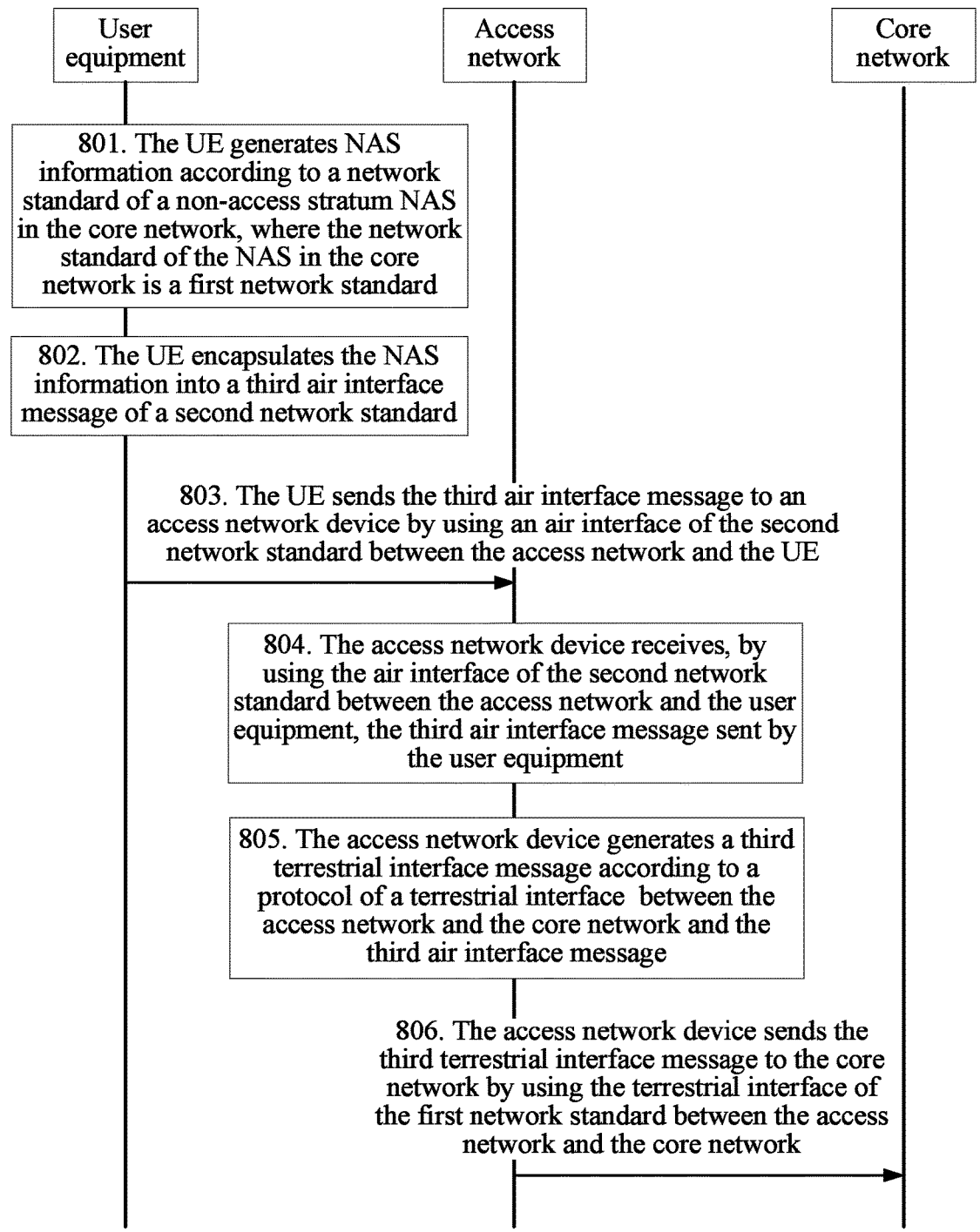
FIG. 8 is another signaling flowchart of mobile communication according to an embodiment of the present invention.

An embodiment of the present invention provides another mobile communications method. For ease of description, in this embodiment, the method provided in this embodiment is described in detail by using an example in which a core network device shown in FIG. 6 is an MME in a core network, a network standard of which is an LTE network, a network standard of an NAS in the core network is an LTE network, an access network device is an access network logic entity having a capability of processing multiple network standards, and specifically, it may be that a terrestrial interface among an SRC, the MME, and an RAN is an S1 interface of an LTE network standard and an air interface between the RAN and user equipment is a Uu interface of a UMTS network standard. The SRC is an access network device having a capability of processing multiple network standards, so that after receiving, from the air interface between the access network and the user equipment, a third air interface message sent by the user equipment, the SRC may convert the received third air interface message into a third terrestrial interface message conforming to a terrestrial interface protocol of another network standard, thereby implementing network standard decoupling between an air interface and a terrestrial interface, and forming a real communications system fusing multiple network standards. Referring to FIG. 8, the process of the method provided in this embodiment is specifically described as follows:

801: A UE generates NAS information according to a network standard of a non-access stratum NAS in a core network, where the network standard of the NAS in the core network is a third network standard.

The manner of determining the network standard of the NAS in the core network is not specifically limited in this embodiment, may be preconfigured in the UE, or may be configured by the access network device by sending a message, which includes, but is not limited to, that the access network sends the network standard of the NAS in the core network to the user equipment by using a system message or dedicated message, so that the user equipment determines the network standard of the NAS in the core network according to the received network standard of the NAS in the core network sent by the access network.

The network standard of the NAS in the core network sent by the access network by using a system message or dedicated message is classified into uplink and downlink, that is, the access network may send an uplink network standard and a downlink network standard of the NAS in the core network for the uplink and the downlink respectively, and send the uplink network standard and the downlink network standard to the user equipment by using the system message or dedicated message. Additionally, if the network standard of the NAS in the core network is changed, the access network sends, by using the system message or dedicated message, the new changed network standard of the NAS in the core network to the user equipment after the changing.

Specifically, by using FIG. 6 as an example, when an NAS triggering message of the user equipment is generated, the UE determines, according to the received network standard of the NAS in the core network sent by the SRC, that the network standard of the NAS in the core network is an LTE network, and generates the NAS information of the user equipment, which is LTE NAS: attach request (Attach Request) information.

802: The UE encapsulates the NAS information into the third air interface message of the second network standard.

For this step, the network standard of the air interface between the access network and the user equipment is recorded in the user equipment, and therefore, the user equipment encapsulates the NAS information into the third air interface message according to the recorded network standard of the air interface between the access network and the user equipment, for example, the UE encapsulates the NAS information into the third air interface message of the second network standard according to an air interface protocol of an air interface of the second network standard between the access network and the user equipment.

It should be noted that, the third air interface message may only include NAS information, or may further include information sent to the access network device, for example, the UE may obtain an RRC message and encapsulate the RRC message into the third air interface message, which is not limited herein.

Additionally, the encapsulating method for performing encapsulating into a third air interface message is not specifically limited in this embodiment, and includes, but is not limited to, that the user equipment encodes the obtained message content and the generated NAS information of the user equipment according to the air interface protocol between the access network and the user equipment, to form the third air interface message.

Specifically, by using FIG. 6 as an example, the UE records that the network standard of the air interface between the RAN and the UE is a UMTS network, and therefore, the UE encodes, according to a recorded air interface protocol of the UMTS network of the air interface between the RAN and the UE, the obtained RRC message and the generated LTE NAS: Attach Request message, and encapsulates the RRC message and the LTE NAS: Attach Request message into the UMTS: initial direct transfer message (INITIAL DIRECT TRANSFER) to form the third air interface message.

803: The UE sends the third air interface message to the access network device by using an air interface of the second network standard between an access network and the UE.

For this step, the manner of sending the third air interface message is not specifically limited in this embodiment, and if the third air interface message is divided into multiple messages for sending, the foregoing user equipment may send the third air interface message in a manner of sending messages in batches, or in a manner of sending messages once for all, which is not limited herein.

Specifically, in FIG. 6, UMTS: INITIAL DIRECT TRANSFER messages are sent to the SRC once for all by using the air interface between the RAN and the UE, and certainly, for a situation in which there are multiple third air interface messages, the third air interface messages may also be sent to the SRC in batches by using the air interface between the RAN and the UE.

804: The access network device receives, by using the air interface of the second network standard between the access network and the user equipment, the third air interface message sent by the user equipment.

For this step, the receiving manner of receiving the third air interface message is not specifically limited in this embodiment, and if the third air interface message is divided into multiple messages for sending, the foregoing access network device may specifically receive the third air interface message in a manner of receiving messages in batches, or in a manner of receiving messages once for all, which is not limited herein.

Specifically, still by using FIG. 6 as an example, the SRC receives once for all, by using the air interface between the RAN and the UE, the UMTS: INITIAL DIRECT TRANSFER message sent by the UE. Certainly, for a situation in which there are multiple third air interface messages, the third air interface messages sent by the UE may also be received in batches by using the air interface between the RAN and the UE.

805: The access network device generates, according to an interface protocol of a terrestrial interface of a first network standard between the access network and the core network and the third air interface message, a third terrestrial interface message of the first network standard.

Before this step, the access network device determines whether the terrestrial interface between the access network and the core network needs to be switched, and if the terrestrial interface needs to be switched, the access network device determines a target terrestrial interface between the access network and the core network after the switching, and switches the terrestrial interface between the access network and the core network to the target terrestrial interface. Therefore, if the terrestrial interface between the access network and the core network is switched to the target terrestrial interface, in this step, the access network device generates a third terrestrial message according to a terrestrial interface protocol of the target terrestrial interface between the access network and the core network after the switching and the third air interface message; otherwise, in this step, the access network device generates a third terrestrial interface message according to an original terrestrial interface protocol between the access network and the core network and a third air interface message.

Additionally, the network standard of the terrestrial interface between the access network and the core network is recorded in the access network, and therefore, the access network device generates the third terrestrial interface message according to the recorded terrestrial interface protocol between the access network and the core network and the third air interface message, for example, the access network device generates, according to a terrestrial interface protocol between the access network and the core network and a radio bearer parameter in the third air interface message, a radio bearer parameter corresponding to the terrestrial interface protocol, to obtain the third terrestrial interface message, for example, generates a radio bearer parameter of a corresponding terrestrial interface for radio bearer parameters such as a delay and a rate, to obtain the third terrestrial interface message, and certainly may also generate another parameter, which is not specifically limited herein.

Specifically, in FIG. 6, the SRC records that the network standard of the terrestrial interface between the RAN and the MME is an LTE network, and therefore, the SRC generates a radio bearer parameter of an LTE terrestrial interface according to the recorded terrestrial interface protocol of the LTE network of the terrestrial interface between the RAN and the MME and a UMTS NAS: Attach Request message, and encapsulates the radio bearer parameter into an LTE: initial user equipment message (INITIAL UE MESSAGE), to form the third terrestrial interface message.

The first network standard, the second network standard, and the third network standard may be the same, or may be different from each other, which is not limited herein.

Moreover, the access network device needs to generate the third terrestrial interface message according to the terrestrial interface protocol between the access network and the core network and the third air interface message received by using the air interface between the access network and the user equipment. However, the network standard of the user equipment and the network standard of the core network separately may be any network standard, for example, may be a GSM network, or a UMTS network, or an LTE network. If the network standard of the user equipment and the network standard of the core network are the same, the access network device may directly generate the third terrestrial interface message according to the recorded terrestrial interface protocol between the access network and the core network and the third air interface message; if the network standard of the user equipment and the network standard of the core network are different, the access network device may map the air interface protocol between the access network and the user equipment to terrestrial interface protocols between the access networks of multiple network standards and the core networks of multiple network standards. For example, mapping between one air interface protocol and three terrestrial interface protocols is implemented, or mapping between two air interface protocols and three terrestrial interface protocols is implemented, or mapping between three air interface protocols and three terrestrial interface protocols is implemented, and the access network device maps an air interface protocol between the access network and the user equipment to a terrestrial interface protocol between the access network and the core network by using a multi-protocol mapping capability of the access network device, and generates the third terrestrial interface message according to the terrestrial interface protocol between the access network and the core network and the third air interface message.

Specifically, in FIG. 6, the network standard of the UE is a UMTS network, and the network standard of the MME is an LTE network. For example, in the manner 1 in step 402, the SRC determines, according to the received UMTS NAS: Attach Request message and a preset mapping relationship between a UMTS air interface message and an LTE terrestrial interface message, to generate an LTE: INITIAL UE MESSAGE message; the SRC generates a radio bearer parameter of the LTE terrestrial interface according to the terrestrial interface protocol of the LTE network of the terrestrial interface between the RAN and the MME, and encapsulates the radio bearer parameter into the LTE: INITIAL UE MESSAGE message, to form the third terrestrial interface message.

It should be noted that, with the development of communications technologies, if a new network standard different from existing network standards is generated, or a new network standard compatible with existing various network standards is generated, a network standard of a terrestrial interface between the access network and the core network may be fixed as the new network standard. A multi-protocol mapping capability of the access network device in mapping the air interface protocol between the access network and the user equipment to terrestrial interface protocols between access networks of multiple network standards and core networks of multiple network standards is converted into a many-to-one protocol mapping capability of mapping between multiple air interface protocols and one terrestrial interface protocol, and the access network device ensures, by using this many-to-one protocol mapping capability, that evolution of air interface network standards does not affect evolution of terrestrial interfaces, so as to really implement decoupling between a terrestrial interface and an air interface.

806: The access network device sends, by using the terrestrial interface of the first network standard between the access network and the core network, the third terrestrial interface message to the core network.

For this step, the manner of sending the third terrestrial interface message is not specifically limited in this embodiment, and if the third terrestrial interface message is divided into multiple messages for sending, the foregoing access network device may send the third terrestrial interface message in a manner of sending messages in batches, or in a manner of sending messages once for all.

Specifically, in FIG. 6, the SRC sends the LTE: INITIAL UE MESSAGE messages once for all to the MME by using the terrestrial interface between the RAN and the MME. Certainly, for a situation in which there are multiple third terrestrial interface messages, the third terrestrial interface messages may also be sent to the MME in batches by using the user interface between the RAN and the MME.

It should be noted that, in the schematic diagram of mobile communication provided in FIG. 6 in this embodiment, the user equipment may be an individual user equipment, or may be multiple user equipments; the network standard corresponding to the core network in the schematic diagram of mobile communication provided in FIG. 6 is not specifically limited in this embodiment, for example, may be an LTE network, or may be a GSM network, or a UMTS network, or another network standard; the network standard of the core network in the schematic diagram of mobile communication provided in FIG. 5 is not specifically limited in this embodiment either, for example, may be an LTE network, or may be a GSM network, or a UMTS network, or another network standard; the network standard of the NAS in the core network in the schematic diagram of mobile communication provided in FIG. 6 is likewise not specifically limited in this embodiment, for example, may be an LTE network, or may be a GSM network, or a UMTS network, or another network standard.

To sum up, according to the method provided in this embodiment, after generating a third air interface message, user equipment sends the third air interface message to an access network by using an air interface between the access network and the user equipment, and an access network device generates a third terrestrial interface message according to a terrestrial interface protocol between the access network and a core network and the received third air interface message, and sends the third terrestrial interface message to the core network, so that cross-system fusion is implemented while decoupling between a terrestrial interface and an air interface in mobile communication is completed, thereby implementing network standard decoupling between an NAS interface and an air interface and a terrestrial interface, simplifying a cross-system mobile communication process, reducing signaling and a delay of an inter-system operation, and improving user experience.

Figure 9:
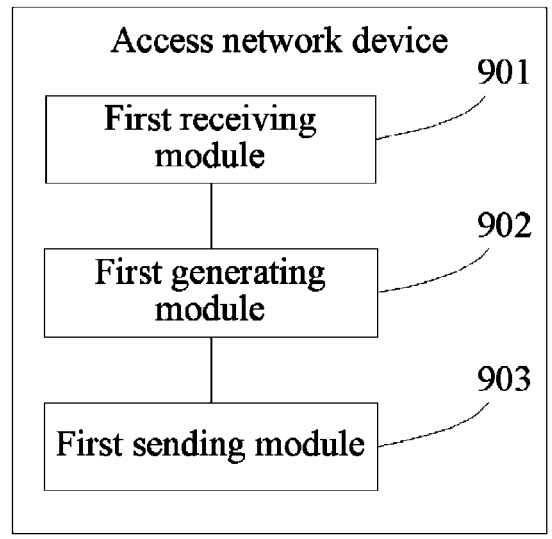
FIG. 9 is a schematic structural diagram of an access network device according to an embodiment of the present invention.

An embodiment of the present invention provides an access network device. Referring to FIG. 9, the access network device may be configured to perform the operation steps of the access network device in the method embodiment shown in FIG. 1, and specifically includes a first receiving module 901, a first generating module 902, and a first sending module 903.

The first receiving module 901 is configured to receive, by using a terrestrial interface of a first network standard between an access network and a first core network, a first terrestrial interface message of the first network standard sent by the first core network.

The first generating module 902 is configured to generate, according to an air interface protocol of an air interface of a second network standard between the access network and a user equipment UE and the first terrestrial interface message received by the first receiving module, a first air interface message of the second network standard.

The first sending module 903 is configured to send, by using the air interface of the second network standard, the first air interface message generated by the first generating module to the UE.

The first network standard and the second network standard both may be any network standard, and the two may be the same, or may be different.

For a specific implementation manner of the first generating module 902, reference may be made to related description in step 102.

Figure 10:
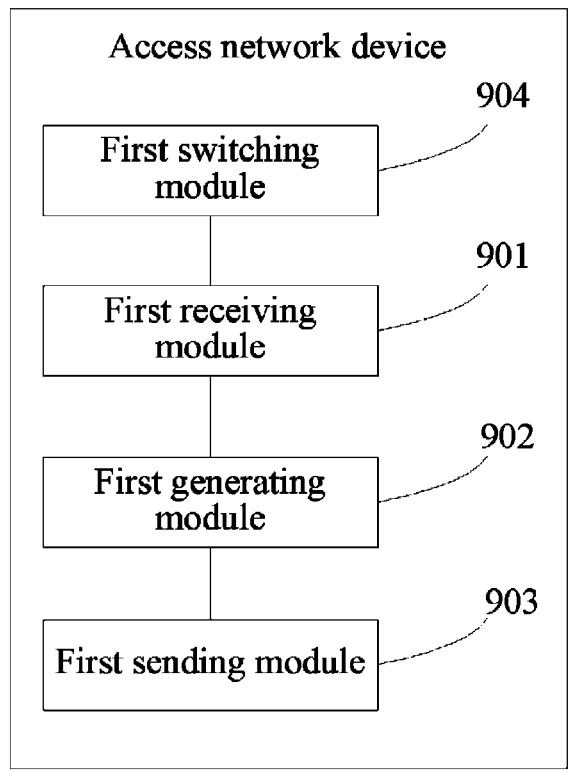
FIG. 10 is a schematic structural diagram of another access network device according to an embodiment of the present invention.

Optionally, referring to FIG. 10, the access network device further includes:

a first switching module 904, configured to: before the first receiving module 901 receives the first terrestrial interface message sent by the first core network, if the access network device determines the UE is handover to the second network standard, allocate a resource to the UE in a network of the second network standard, and instruct the UE to access the network the second network standard.

Figure 11:
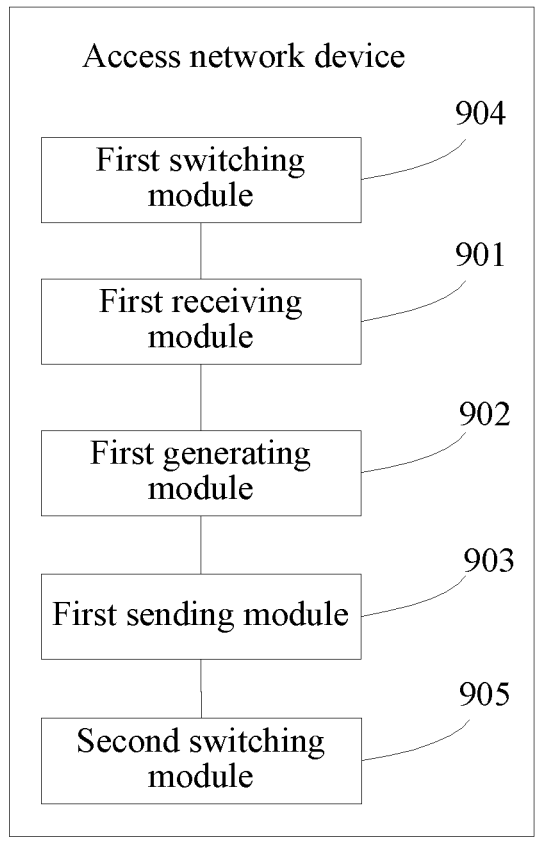
FIG. 11 is a schematic structural diagram of another access network device according to an embodiment of the present invention.

Further, referring to FIG. 11, the access network device further includes:

a second switching module 905, configured to: if the access network device determines the UE is handover from the first core network to a second core network, switch the UE from the terrestrial interface of the first network standard between the access network and the first core network to a terrestrial interface of a third network standard between the access network and the second core network.

The third network standard may be the same as the first network standard or the second network standard, or may be another standard except the first network standard and the second network standard.

Further, the first receiving module 901 is further configured to receive, by using the terrestrial interface of the third network standard between the access network and the second core network, a second terrestrial interface message sent by the second core network;

the first generating module 902 is further configured to generate, according to the air interface protocol of the air interface of the second network standard and the second terrestrial interface message of the third network standard received by the first receiving module 901, a second air interface message of the second network standard; and the first sending module 903 is further configured to send, by using the air interface of the second network standard, the second air interface message generated by the first generating module 902 to the UE.

It should be noted that, only core network switching may occur in the access network device, that is, the access network device only includes the second switching module 905.

To sum up, the access network device provided in this embodiment generates a first air interface message of a second network standard according to an air interface protocol of the second network standard and a first terrestrial interface message received by using a terrestrial interface of a first network standard between an access network and a first core network, and sends the first air interface message to user equipment, thereby implementing direct communication between network devices of different standards in a mobile communications system, implementing cross-system fusion while completing cross-system decoupling between a terrestrial interface and an air interface, simplifying a cross-system mobile communication process, reducing signaling and a delay of an inter-system operation, and improving user experience.

Figure 12:
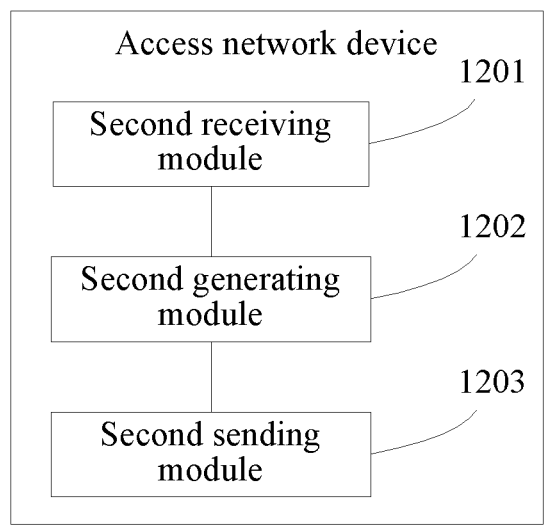
FIG. 12 is a schematic structural diagram of still another access network device according to an embodiment of the present invention.

An embodiment of the present invention provides another access network device. Referring to FIG. 12, the access network device may be configured to perform the method shown in FIG. 4, and specifically includes a second receiving module 1201, a second generating module 1202, and a second sending module 1203.

The second receiving module 1201 is configured to receive, by using an air interface of a second network standard between an access network and a user equipment UE, a third air interface message of the second network standard sent by the UE.

The second generating module 1202 is configured to generate, according to an interface protocol of a terrestrial interface of a first network standard between the access network and a first core network and the third air interface message received by the second receiving module 1201, a third terrestrial interface message of the first network standard.

The second sending module 1203 is configured to send, by using the terrestrial interface between the access network and the first core network, the third terrestrial interface message generated by the second generating module to the first core network.

The first network standard and the second network standard both may be any network standard, and the two may be the same, or may be different. The second generating module 1202 specifically may use the implementation manner in step 402, which is not described again herein.

Figure 13:
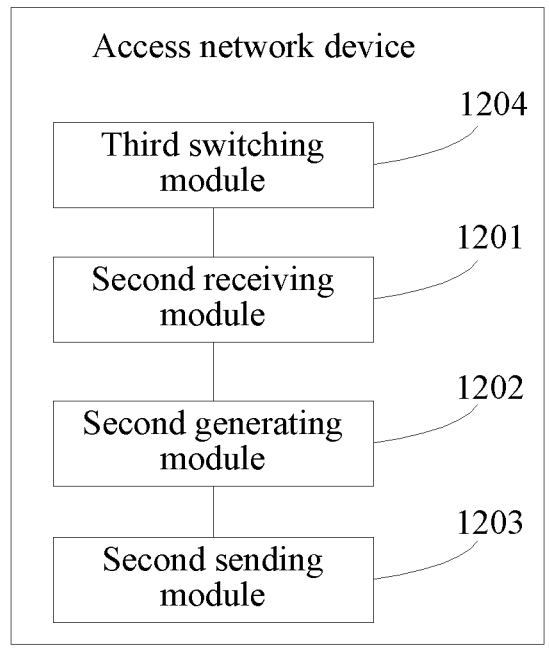
FIG. 13 is a schematic structural diagram of still another access network device according to an embodiment of the present invention.

Optionally, referring to FIG. 13, the access network device further includes:

a third switching module 1204, configured to: before the second receiving module 1201 receives the third air interface message sent by the UE, if the access network device determines the UE is handover to the second network standard, allocate a resource to the UE in a network of the second network standard, and instruct the UE to access the network of the second network standard.

Figure 14:
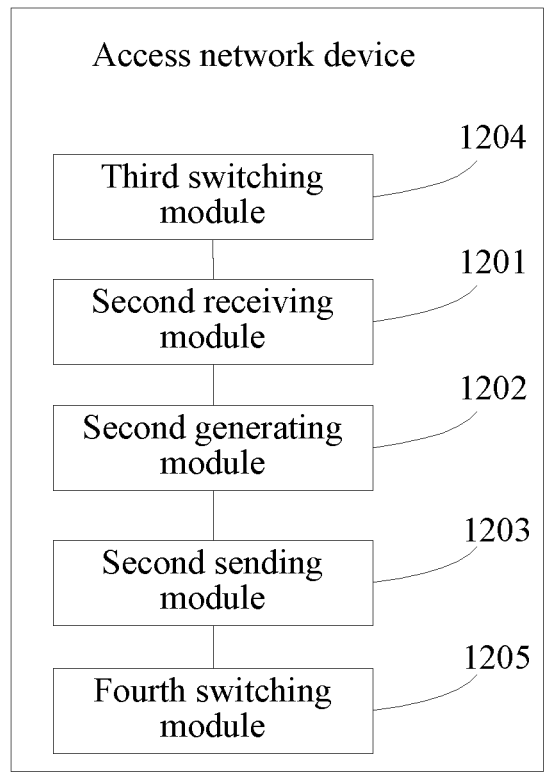
FIG. 14 is a schematic structural diagram of still another access network device according to an embodiment of the present invention.

Optionally, referring to FIG. 14, the access network device further includes:

a fourth switching module 1205, configured to: if the access network device determines to the UE is handover from the first core network to a second core network, switch the UE from the terrestrial interface of the first network standard between the access network and the first core network to a terrestrial interface of a third network standard between the access network and the second core network.

The third network standard may be any network standard, and may be the same as or different from the first network standard or the second network standard.

Further, the second receiving module 1201 is further configured to receive, by using the air interface of the second network standard, a fourth air interface message of the second network standard sent by the UE;

the second generating module 1202 is further configured to generate, according to an interface protocol of the terrestrial interface of the third network standard between the access network and the second core network and the fourth air interface message received by the second receiving module 1201, a fourth terrestrial interface message of the third network standard; and the second sending module 1203 is further configured to send, by using the terrestrial interface of the third network standard between the access network and the second core network, the fourth terrestrial interface message generated by the second generating module 1202 to the second core network.

The access network device provided in this embodiment generates a third terrestrial interface message of a first network standard according to an interface protocol of a terrestrial interface of the first network standard between an access network and a first core network and a third air interface message that is received by using an air interface of a second network standard between the access network and user equipment, and sends the third terrestrial interface message to the first core network, thereby implementing direct communication between network devices of different standards in a mobile communications system, implementing cross-system fusion while completing cross-system decoupling between a terrestrial interface and an air interface, reducing signaling and a delay of an inter-system operation, and improving user experience.

Figure 15:
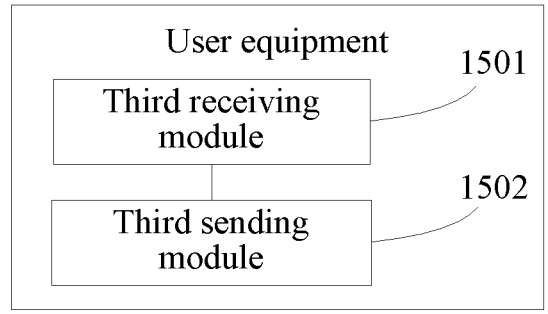
FIG. 15 is a schematic structural diagram of user equipment according to an embodiment of the present invention.

An embodiment of the present invention provides a user equipment, the equipment is configured to execute the function executed by the user equipment in implementation of the mobile communications method provided in the foregoing embodiment. Referring to FIG. 15, the user equipment may be configured to perform the operation steps of the user equipment in the method shown in FIG. 3 or FIG. 7, and specifically includes a third receiving module 1501 and a third receiving module 1502.

The third receiving module 1501 is configured to receive, by using an air interface of a second network standard between an access network and the user equipment UE, a first air interface message of the second network standard sent by an access network device.

The third network standard and the second network standard both may be any network standard, and the two may be the same, or may be different.

The third sending module 1502 is configured to send a response message to the access network device according to the first air interface message received by the third receiving module 1501.

The first air interface message is generated according to an air interface protocol of the air interface of the second network standard and a first terrestrial interface message of a first network standard sent by a first core network; the response message sent by the third sending module 1502 may only serve as an acknowledgement for the first air interface message, which is not limited.

Optionally, the first air interface message includes non-access stratum NAS information of the first core network, a network standard of the NAS information is a third network standard, and the user equipment further includes:

a parsing module 1503, configured to parse out, according to the network standard of the NAS information, the NAS information from the first air interface message received by the third receiving module 1501.

The third network standard may be any network standard, may be the same as the first network standard or the second network standard, or may be different from either of the first network standard and the second network standard.

Optionally, the first air interface message may further include indication information, and the indication information is used to indicate the network standard of the NAS information.

Before obtaining, through parsing, the NAS information in the first air interface message received by the third receiving module 1501, the parsing module 1503 parses the indication information in the first air interface message, to obtain the network standard of the NAS information.

Optionally, before the third receiving module 1501 receives, by using the air interface of the second network standard between the access network and the UE, the first air interface message that includes the non-access stratum NAS information of the first core network and is sent by the access network device, the third receiving module 1501 is further configured to:

receive a notification message that includes a network standard of a non-access stratum in the first core network and is sent by the access network device, where the network standard of the non-access stratum in the first core network is the third network standard; and determine the network standard of the NAS information according to the network standard of the non-access stratum in the first core network.

The notification message may be a system message or another message, which is not limited herein.

To sum up, according to the equipment provided in this embodiment, the user equipment receives a first air interface message of a second network standard, where the first air interface message is generated according to an air interface protocol of an air interface of the second network standard and a first terrestrial interface message of a first network standard sent by a first core network, so that communication among the UE, the access network, and the first core network is implemented, thereby implementing direct communication between devices of different network standards, simplifying a cross-system mobile communication process, reducing signaling and a delay of an inter-system operation, decoupling an air interface from a terrestrial interface, and improving user experience.

Figure 16:
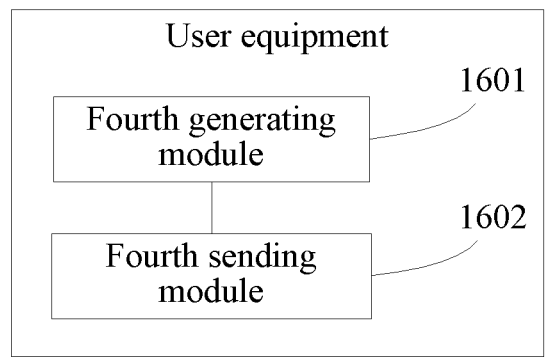
FIG. 16 is a schematic structural diagram of another user equipment according to an embodiment of the present invention.

An embodiment of the present invention provides another user equipment, and the equipment is configured to perform the operation performed by the user equipment in the method embodiment shown in FIG. 5 or FIG. 8. Referring to FIG. 16, the user equipment includes:

a fourth generating module 1601, configured to generate a third air interface message of a second network standard; and a fourth sending module 1602, configured to send, by using an air interface of the second network standard between an access network and the UE, the third air interface message to an access network device, so that the access network device generates, according to an interface protocol of a terrestrial interface of a first network standard between the access network and a first core network and the third air interface message, a third terrestrial interface message of the first network standard.

The first network standard and the second network standard both may be any network standard of GSM, UMTS, and LTE, or another standard, and the two may be the same, or may be different.

The fourth generating module 1601 is further configured to:

before generating the third air interface message, generate NAS information according to a network standard of a non-access stratum in the first core network, where the network standard of the non-access stratum in the first core network is a third network standard; and encapsulate the NAS information into the third air interface message of the second network standard.

The third network standard may be any network standard, and may be the same as or different from the first network standard or the second network standard.

To sum up, the user equipment provided in this embodiment generates a third air interface message of a second network standard, and the UE sends the third air interface message to an access network device by using an air interface of the second network standard between an access network and the UE, so that the access network device generates a third terrestrial interface message of a first network standard according to an interface protocol of a terrestrial interface of the first network standard between the access network and a first core network and the third air interface message, thereby implementing direct communication between devices of different network standards, completing cross-system decoupling between a terrestrial interface and an air interface, simplifying a cross-system mobile communication process, reducing signaling and a delay of an inter-system operation, and improving user experience.

Figure 17:
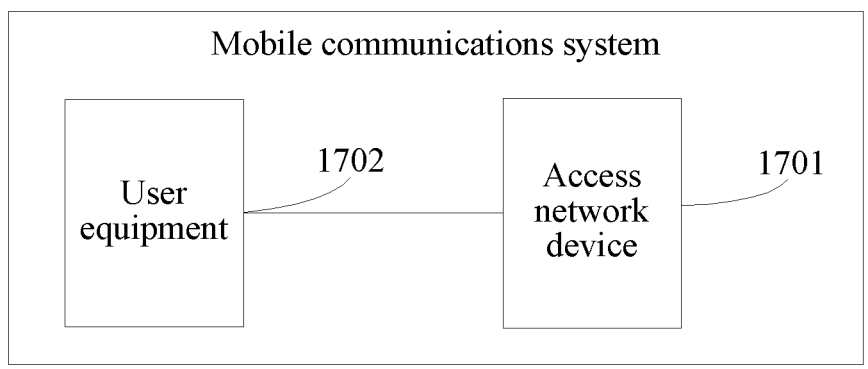
FIG. 17 is a schematic structural diagram of a mobile communications system according to an embodiment of the present invention.

An embodiment of the present invention provides a mobile communications system, and the system is configured to perform the mobile communications method provided in the foregoing embodiment. Referring to FIG. 17, the system includes:

an access network device 1701 and user equipment 1702, where the access network device 1701 is any access network device in FIG. 9 to FIG. 11 (reference may be made to the foregoing embodiments); and the user equipment 1702 is the user equipment shown in FIG. 15 (reference may be made to the foregoing embodiments); or the access network device 1701 is any access network device in FIG. 12 to FIG. 14 (reference may be made to the foregoing embodiments); and the user equipment 1702 is the user equipment shown in FIG. 16 (reference may be made to the foregoing embodiments).

To sum up, the system provided in this embodiment implements cross-system fusion while completing cross-system decoupling between a terrestrial interface and an air interface, reduces signaling and a delay of an inter-system operation, implements network standard decoupling between an NAS interface and an air interface and a terrestrial interface, simplifies a cross-system mobile communication process, and forms a real communications system fusing multiple network standards.

An embodiment of the present invention provides an access network device, and the access network device may be configured to perform the operation steps of the access network device in the method embodiment shown in FIG. 1, and specifically includes:

a receiver, configured to receive, by using a terrestrial interface of a first network standard between an access network and a first core network, a first terrestrial interface message of the first network standard sent by the first core network;

a processor, configured to generate, according to an air interface protocol of an air interface of a second network standard between the access network and a user equipment UE and the first terrestrial interface message received by the receiver, a first air interface message of the second network standard; and a transmitter, configured to send, by using the air interface of the second network standard, the first air interface message generated by the processor to the UE.

Optionally, the processor is further configured to: before the receiver receives the first terrestrial interface message sent by the first core network, if the access network device determines the UE is handover to the second network standard, allocate a resource to the UE in the second network standard; and the transmitter is further configured to: after the processor allocates the resource to the UE in a network of the second network standard, instruct the UE to access the network of the second network standard.

The first network standard and the second network standard both may be any network standard, and the two may be the same, or may be different.

Optionally, the processor is further configured to:

if the access network device determines the UE is handover from the first core network to a second core network, switch the UE from the terrestrial interface of the first network standard between the access network and the first core network to a terrestrial interface of a third network standard between the access network and the second core network.

The third network standard may be any network standard, and may be the same as or different from the second network standard.

Further, the receiver is further configured to receive, by using the terrestrial interface of the third network standard between the access network and the second core network, a second terrestrial interface message of the third network standard sent by the second core network;

the processor is further configured to generate, according to the air interface protocol of the air interface of the second network standard and the second terrestrial interface message received by the receiver, a second air interface message of the second network standard; and the transmitter is further configured to send, by using the air interface of the second network standard, the second air interface message generated by the processor to the UE.

The access network device provided in this embodiment generates a first air interface message of a second network standard according to an air interface protocol of the second network standard and a first terrestrial interface message received by using a terrestrial interface between an access network and a first core network, and sends the first air interface message to user equipment, thereby implementing direct communication between network devices of different standards in a mobile communications system, implementing cross-system fusion while completing cross-system decoupling between a terrestrial interface and an air interface, simplifying a cross-system mobile communication process, reducing signaling and a delay of an inter-system operation, and improving user experience.

An embodiment of the present invention provides another access network device, and the access network device may be configured to perform the operation steps of the access network device in the method embodiment shown in FIG. 4, and specifically includes:

a receiver, configured to receive, by using an air interface of a second network standard between an access network and a user equipment UE, a third air interface message of the second network standard sent by the UE;

a processor, configured to generate, according to an interface protocol of a terrestrial interface of a first network standard between the access network and a first core network and the third air interface message received by the receiver, a third terrestrial interface message of the first network standard; and a transmitter, configured to send, by using the terrestrial interface of the first network standard between the access network and the first core network, the third terrestrial interface message generated by the processor to the first core network.

The first network standard and the second network standard both may be any network standard, and the two may be the same, or may be different.

Optionally, the processor is further configured to: before the receiver receives the third air interface message sent by the UE, if the access network device determines the UE is handover to the second network standard, allocate a resource to the UE in the second network standard; and the transmitter is further configured to: after the processor allocates the resource to the UE in a network of the second network standard, instruct the UE to access the network of the second network standard.

Optionally, the processor is further configured to:

if the access network device determines the UE is handover from the first core network to a second core network, switch the UE from the terrestrial interface of the first network standard between the access network and the first core network to a terrestrial interface of a third network standard between the access network and the second core network.

The third network standard may be any network standard, and may be the same as or different from the second network standard.

Further, the receiver is further configured to receive, by using the air interface of the second network standard, a fourth air interface message of the second network standard sent by the UE;

the processor is further configured to generate, according to an interface protocol of the terrestrial interface of the third network standard between the access network and the second core network and the fourth air interface message received by the receiver, a fourth terrestrial interface message of the third network standard; and the transmitter is further configured to send, by using the terrestrial interface of the third network standard between the access network and the second core network, the fourth terrestrial interface message generated by the processor to the second core network.

The access network device provided in this embodiment generates a third terrestrial interface message of a first network standard according to an interface protocol of a terrestrial interface of the first network standard between an access network and a first core network and a third air interface message that is received by using an air interface of a second network standard between the access network and user equipment, and sends the third terrestrial interface message to the first core network, thereby implementing direct communication between network devices of different standards in a mobile communications system, implementing cross-system fusion while completing cross-system decoupling between a terrestrial interface and an air interface, simplifying a cross-system mobile communication process, reducing signaling and a delay of an inter-system operation, and improving user experience.

An embodiment of the present invention provides user equipment, and the user equipment may be configured to perform the operation steps of the user equipment in the method embodiment shown in FIG. 1, and specifically includes:

a receiver, configured to receive, by using an air interface of a second network standard between an access network and the user equipment UE, a first air interface message of the second network standard sent by an access network device;

a processor, configured to construct a response message according to the first air interface message received by the receiver; and a transmitter, configured to send the response message constructed by the processor to the access network device.

The first air interface message is generated according to an air interface protocol of the air interface of the second network standard and a first terrestrial interface message of a first network standard sent by a first core network.

The first network standard and the second network standard both may be any network standard, and the two may be the same, or may be different.

Optionally, the first air interface message may include non-access stratum NAS information of the first core network, a network standard of the NAS information is a third network standard, and the processor is further configured to:

parse out, according to the network standard of the NAS information, the NAS information from the first air interface message.

Further, the first air interface message may further include indication information, and the indication information is used to indicate the network standard of the NAS information; and the processor is further configured to parse the indication information in the first air interface message, to obtain the network standard of the NAS information.

Optionally, before the processor parses out, according to the network standard of the NAS information, the NAS information from the first air interface message, the receiver is further configured to:

receive a notification message that includes a network standard of a non-access stratum in the first core network and is sent by the access network device; and determine the network standard of the NAS information according to the network standard of the non-access stratum in the first core network.

The network standard of the non-access stratum in the first core network is the third network standard, and the third network standard may be different from or the same as either of the first network standard and the second network standard.

The notification message may be a system message, or may be another configuration message, which is not limited herein.

To sum up, according to the user equipment provided in this embodiment, the user equipment receives a first air interface message of a second network standard, where the first air interface message is generated according to an air interface protocol of an air interface of the second network standard and a first terrestrial interface message of a first network standard sent by a first core network, so that communication among the UEs, the access network, and the first core network is implemented, thereby implementing direct communication between devices of different network standards, simplifying a cross-system mobile communication process, reducing signaling and a delay of an inter-system operation, decoupling an air interface from a terrestrial interface, and improving user experience.

An embodiment of the present invention provides another user equipment, and the user equipment includes:

a processor, configured to generate a third air interface message of a second network standard; and a transmitter, configured to send, by using an air interface of the second network standard between an access network and the UE, the third air interface message to an access network device, so that the access network device generates, according to an interface protocol of a terrestrial interface of a first network standard between the access network and a first core network and the third air interface message, a third terrestrial interface message of the first network standard.

The first network standard and the second network standard both may be any network standard, and the two may be the same, or may be different.

Optionally, the processor is further configured to:

before generating the third air interface message, generate NAS information according to a network standard of a non-access stratum in the first core network, where the network standard of the non-access stratum in the first core network is a third network standard; and encapsulate the NAS information into the third air interface message of the second network standard.

The third network standard may be any network standard, and may be the same as or different from the first network standard or the second network standard.

To sum up, the user equipment provided in this embodiment generates a third air interface message of a second network standard, and the UE sends the third air interface message to an access network device by using an air interface of the second network standard between an access network and the UE, so that the access network device generates a third terrestrial interface message of a first network standard according to an interface protocol of a terrestrial interface of the first network standard between the access network and a first core network and the third air interface message, thereby implementing direct communication between devices of different network standards, completing cross-system decoupling between a terrestrial interface and an air interface, simplifying a cross-system mobile communication process, reducing signaling and a delay of an inter-system operation, and improving user experience.

It should be noted that when the access network device and the user equipment provided in the foregoing embodiments implement mobile communication, description is made only through examples of division of the functional modules. In an actual application, the functions may be assigned according to needs to be implemented by different functional modules, that is, the internal structure of the device is divided into different functional modules, so as to implement all or a part of the functions described above. Furthermore, the embodiments of the access network device, the user equipment, the system provided by the foregoing embodiments belong to the same idea as the embodiment of the cross-system interoperation method, and for details of a specific implementation process thereof, refer to the method embodiment, which are not repeated herein.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A mobile communications method, wherein the method is performed by a single radio controller and the method comprises:
   receiving, by the single radio controller by using a terrestrial interface of a first network standard between an access network and a first core network, a first terrestrial interface message of the first network standard sent by the first core network;
   generating, by the single radio controller according to an air interface protocol of an air interface of a second network standard between the access network and user equipment (UE) and the first terrestrial interface message, a first air interface message of the second network standard;
   sending, by the single radio controller by using the air interface of the second network standard, the first air interface message to the UE;
   determining, by the single radio controller that the UE is handover from the first core network to a second core network according to the service requirements of the UE, wherein the terrestrial interface between the second core network and the access network is a terrestrial interface of a third network standard; and
   switching, by the single radio controller, the UE from the terrestrial interface of the first network standard between the access network and the first core network to the terrestrial interface between the access network and the second core network.

2. The method according to claim 1, wherein before the receiving, by the single radio controller by using a terrestrial interface of a first network standard between an access network and a first core network, a first terrestrial interface message of the first network standard sent by the first core network, the method further comprises:
   if the UE is handover to the second network standard, allocating by the single radio controller a resource to the UE in a network of the second network standard, and instructing the UE to access the network of the second network standard.

3. The method according to claim 1, wherein the method further comprises:
   receiving, by the single radio controller by using the terrestrial interface of the third network standard between the access network and the second core network, a second terrestrial interface message of the third network standard sent by the second core network;
   generating, by the single radio controller according to the air interface protocol of the air interface of the second network standard and the second terrestrial interface message, a second air interface message of the second network standard; and
   sending, by the single radio controller by using the air interface of the second network standard, the second air interface message to the UE.

4. An access network device, comprising:
   a single radio controller comprising:
      a receiver, configured to receive, by using a terrestrial interface of a first network standard between an access network and a first core network, a first terrestrial interface message of the first network standard sent by the first core network;
      a processor, configured to generate, according to an air interface protocol of an air interface of a second network standard between the access network and user equipment (UE) and the first terrestrial interface message received by the receiver, a first air interface message of the second network standard; and
      a transmitter, configured to send, by using the air interface of the second network standard, the first air interface message generated by the processor to the UE;
   wherein the processor is further configured to:
      determines determine that the UE is handover from the first core network to a second core network according to the service requirements of the UE, wherein the terrestrial interface between the second core network and the access network is a terrestrial interface of a third network standard; and
      switch the UE from the terrestrial interface of the first network standard between the access network and the first core network to the terrestrial interface of between the access network and the second core network.

5. The access network device according to claim 4, wherein
   the processor is further configured to: before the receiver receives the first terrestrial interface message sent by the first core network, if the access network device determines the UE is handover to the second network standard, allocate a resource to the UE in the second network standard; and
   the transmitter is further configured to: after the processor allocates the resource to the UE in a network of the second network standard, instruct the UE to access the network of the second network standard.

6. The access network device according to claim 4, wherein
   the receiver is further configured to receive, by using the terrestrial interface of the third network standard between the access network and the second core network, a second terrestrial interface message of the third network standard sent by the second core network;
   the processor is further configured to generate, according to the air interface protocol of the air interface of the second network standard and the second terrestrial interface message received by the receiver, a second air interface message of the second network standard; and
   the transmitter is further configured to send, by using the air interface of the second network standard, the second air interface message generated by the processor to the UE.

7. User equipment (UE), wherein the user equipment comprises:
 a receiver;
 a transmitter; and
 a processor, wherein
 the receiver is configured to receive, by using an air interface of a second network standard between an access network and the UE, a first air interface message of the second network standard sent by an access network device, wherein the first air interface message comprises non-access stratum (NAS) information, and the network standard of the NAS information is a third network standard;
 the processor is configured to obtain the network standard of the NAS information according to indication information in the first air interface message or in a notification message from the access network device, wherein the indication information comprises a network standard of a non-access stratum in a first core network;
 the processor is further configured to parse out, according to the network standard of the NAS information, the NAS information from the first air interface message, and construct a response message according to the first air interface message received by the receiver; and
 the transmitter is configured to send the response message constructed by the processor to the access network device.

8. The user equipment according to claim 7, wherein the indication information is used to indicate the network standard of the NAS information.

9. The user equipment according to claim 7, wherein the indication information comprises a network standard of a non-access stratum in a first core network, the network standard of the non-access stratum in the first core network is the third network standard;
 the receiver is further configured to receive the notification message.

10. A system, comprising:
 user equipment (UE);
 a first core network configured to send, by using a terrestrial interface of a first network standard between an access network and the first core network, a first terrestrial interface message of the first network standard, wherein the first air interface message comprises non-access stratum (NAS) information of the first core network and a network standard of the NAS information is a third network standard;
 a single radio controller configured to: receive the first terrestrial interface message of the first network standard from the first core network; generate, according to an air interface protocol of an air interface of a second network standard between the access network and the UE and the first terrestrial interface message, a first air interface message of the second network standard; and send, by using the air interface of the second network standard, the first air interface message to the UE;
 the UE is configured to: receive the first air interface message of the second network standard from the single radio controller; obtain the network standard of the NAS information according to indication information in the first air interface message or in a notification message from the single radio controller; and parse out, according to the network standard of the NAS information, the NAS information from the first air interface message; and
 the UE is further configured to construct a response message according to the first air interface message; send the response message to the single radio controller.

11. The system according to claim 10, wherein if the UE is handover from the first core network to a second core network, wherein the terrestrial interface between the second core network and the access network is a terrestrial interface of the third network standard, the single radio controller is further configured to:
 switch the UE from the terrestrial interface of the first network standard between the access network and the first core network to the terrestrial interface between the access network and the second core network.

\* \* \* \* \*